United States Patent
Park et al.

(10) Patent No.: US 12,529,180 B2
(45) Date of Patent: Jan. 20, 2026

(54) CLOTHES TREATING APPARATUS

(71) Applicant: SAMSUNG ELECTRONICS CO., LTD., Suwon-si (KR)

(72) Inventors: Yurim Park, Suwon-si (KR); Seungoh Kim, Suwon-si (KR); Jihye Lee, Suwon-si (KR); Yongbin Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 242 days.

(21) Appl. No.: 18/229,895

(22) Filed: Aug. 3, 2023

(65) Prior Publication Data

US 2024/0125034 A1    Apr. 18, 2024

Related U.S. Application Data

(63) Continuation of application No. PCT/KR2023/009875, filed on Jul. 11, 2023.

(30) Foreign Application Priority Data

Oct. 14, 2022    (KR) ......................... 10-2022-0132772

(51) Int. Cl.
*D06F 37/30*    (2020.01)
*D06F 23/04*    (2006.01)
(Continued)

(52) U.S. Cl.
CPC ............ *D06F 37/304* (2013.01); *D06F 23/04* (2013.01); *D06F 37/206* (2013.01); *D06F 37/24* (2013.01);
(Continued)

(58) Field of Classification Search
None
See application file for complete search history.

(56) References Cited

U.S. PATENT DOCUMENTS 6,905,008 B2    6/2005   Kowalsky et al.
9,976,243 B2    5/2018   Kim et al.
(Continued)

FOREIGN PATENT DOCUMENTS

CN    102206914 A    10/2011
CN    203429443 U    2/2014
(Continued)

OTHER PUBLICATIONS

International Search Report, PCT/ISA/210, dated Oct. 23, 2023, in International Application No. PCT/KR2023/009875.
(Continued)

*Primary Examiner* — Cristi J Tate-Sims
(74) *Attorney, Agent, or Firm* — STAAS & HALSEY LLP

(57) ABSTRACT

A clothes treating apparatus including a housing; a tub inside the housing; a drum configured to be rotated inside the tub; a spin-drying shaft connected to the drum; a motor assembly including a rotor configured to be rotated; a coupler: a first element; and a second element inside the coupler, wherein the coupler is positionable in a first position in which the coupler is coupled to the spin-drying shaft and the rotor, the coupler is positionable in a second position in which the coupler is coupled to the spin-drying shaft and disengaged from the rotor, and with the coupler being positioned in the second position, the first element and the second element are configured to interact to move the second element away from the first element and thereby move the coupler from the second position to the first position.

14 Claims, 30 Drawing Sheets

(51) Int. Cl.
  *D06F 37/20* (2006.01)
  *D06F 37/24* (2006.01)
  *H02K 7/116* (2006.01)
  *H02K 21/22* (2006.01)
  *H02K 49/10* (2006.01)

(52) U.S. Cl.
  CPC ............. *H02K 7/116* (2013.01); *H02K 21/22* (2013.01); *H02K 49/106* (2013.01)

(56) References Cited

U.S. PATENT DOCUMENTS

| | | |
|---|---|---|
| 10,113,260 B2 | 10/2018 | Leany et al. |
| 11,408,110 B2 | 8/2022 | Lee et al. |
| 11,828,016 B2 | 11/2023 | Kim et al. |
| 2022/0034018 A1 | 2/2022 | Lee et al. |
| 2022/0064842 A1* | 3/2022 | Song .................. D06F 37/304 |

FOREIGN PATENT DOCUMENTS

| | | |
|---|---|---|
| CN | 203925721 U | 11/2014 |
| CN | 206333803 U | 7/2017 |
| CN | 206333810 U | 7/2017 |
| CN | 206498313 U | 9/2017 |
| CN | 216922933 U | 7/2022 |
| KR | 2000-0001095 | 1/2000 |
| KR | 10-2015-0039695 A | 4/2015 |
| KR | 10-2016-0123428 A | 10/2016 |
| KR | 10-2018-0023276 A | 3/2018 |
| KR | 10-2021-0054811 A | 5/2021 |

OTHER PUBLICATIONS

Written Opinion, PCT/ISA/237, dated Oct. 23, 2023, in International Application No. PCT/KR2023/009875.

* cited by examiner

CLOTHES TREATING APPARATUS

CROSS-REFERENCE TO RELATED APPLICATION(S)

This application is a continuation application, under 35 U.S.C. § 111(a), of international application No. PCT/KR2023/009875, filed on Jul. 11, 2023, which claims priority to Korean Patent Application No. 10-2022-0132772, filed on Oct. 14, 2022, in the Korean Intellectual Property Office, the disclosure of which is incorporated by reference herein in its entirety.

BACKGROUND

1. Field

The disclosure relates to a door and a clothes treating apparatus including the same, and more particularly to a clothes treating apparatus including a rotating device configured to selectively rotate a drum.

2. Description of Related Art

A clothes treating apparatus is a device capable of applying treatment to clothes, and includes a washing machine and a dryer.

In general, a washing machine is a device that uses a driving force of a driving motor to stir laundry, wash water, and detergent, which are put into a drum together, so that washing is performed through mutual friction.

The washing machine includes a tub for storing water and a drum rotatably installed inside the tub. A pulsator is installed at the bottom of the drum to form a water flow while rotating. The pulsator rotates in the forward and reverse directions to form a water flow, and the water flow generated by the pulsator stirs and rotates the wash water and the laundry, thereby washing the laundry.

The washing machine may perform a washing operation and a spin-drying operation. When the washing machine performs the washing operation, only the pulsator between the drum and the pulsator may rotate. This is because it is required to form the water flow. When the washing machine performs the spin-drying operation, the drum and the pulsator may rotate together.

An expensive motor assembly may be used in the washing machine. The washing machine may include a coupler to select a component, which is rotated by one motor assembly, from the drum and the pulsator.

The coupler may be moved so as to selectively implement the rotation of the drum and the pulsator, and thus it is required to devise a method of moving the coupler.

However, even when the coupler is added, it is required to prevent the washing machine from increasing in height. When the height of the washing machine increases, it may cause inconvenience to a user.

SUMMARY

Aspects of embodiments of the disclosure will be set forth in part in the description which follows and, in part, will be apparent from the description, or may be learned by practice of the presented embodiments.

According to an embodiment of the disclosure, a clothes treating apparatus includes a housing; a tub inside the housing; a drum configured to be rotated inside the tub; a spin-drying shaft connected to the drum; a motor assembly including a rotor configured to be rotated; a coupler; a first element; and a second element inside the coupler, wherein the coupler is positionable in a first position in which the coupler is coupled to the spin-drying shaft and the rotor, the coupler is positionable in a second position in which the coupler is coupled to the spin-drying shaft and disengaged from the rotor, and, with the coupler being positioned in the second position, the first element and the second element are configured to interact to move the second element away from the first element and thereby move the coupler from the second position to the first position.

According to an embodiment of the disclosure, the first element may include a coil configured to form a magnetic field in response to application of a current to the coil, and the second element may be movable to be close to or away from the first element by the magnetic field formed by the coil.

According to an embodiment of the disclosure, the rotor may be located on a first side of the coupler in a direction in which the coupler is moved to the first position, and in order to prevent interference between the coupler and the rotor, the first element may be positioned between the coupler and the tub so that the first element is positioned on a second side of the coupler opposite to the first side of the coupler.

According to an embodiment of the disclosure, the rotor may have a mounting space inside the rotor, the clothes treating apparatus may further include a stator arranged about the spin-drying shaft and configured so that least a portion of the stator is positioned in the mounting space, the stator may include a stator space inside the stator, at least a portion of the coupler may be positioned in the stator space, and the first element may be positioned in the stator space.

According to an embodiment of the disclosure, the spin-drying shaft may be configured to pass through the stator space, and the first element may include a coil wound in a circumferential direction with respect to the spin-drying shaft.

According to an embodiment of the disclosure, the first element may have a cross section having a horizontal length that is greater than a vertical length.

According to an embodiment of the disclosure, the second element may be in contact with the coupler, and may be coupled to the coupler at a side of the coupler facing the first element.

According to an embodiment of the disclosure, the coupler may include a receiving space inside of the coupler, and the second element may be positioned in the receiving space.

According to an embodiment of the disclosure, the second element may be positioned to correspond to the first element.

According to an embodiment of the disclosure, the first element may include a plurality of coils, and the plurality of coils may be arranged in a circumferential direction with respect to the spin-drying shaft so that a magnetic field is formable at a position in which the plurality of coils is arranged.

According to an embodiment of the disclosure, the plurality of coils may include a first coil layer spaced apart from the coupler by a first distance, and a second coil layer spaced apart from the coupler by a second distance that is greater than the first distance, and the second coil layer may be independently controlled from the first coil layer.

According to an embodiment of the disclosure, the first element may include a plurality of part elements arranged in a circumferential direction with respect to the spin-drying shaft, and connected to each other so that all of the plurality of part elements are controllable with a single control signal.

According to an embodiment of the disclosure, the stator space may include a central space through which the spin-drying shaft passes, and a branch space communicated with the central space and disposed in a circumferential direction with respect to the central space, and the first element may include a first part element in the central space, and a second part element in the branch space.

According to an embodiment of the disclosure, the first element may include a coil wound around the spin-drying shaft to form a magnetic field corresponding to the spin-drying shaft.

According to an embodiment of the disclosure, the clothes treating apparatus may further include a pulsator configured to be rotated inside the drum; a reduction gear module coupled to the rotor so that least a portion of the reduction gear module is rotatable at an angular velocity that is lower than an angular velocity of the rotor; and a washing shaft coupled to the pulsator and the reduction gear module to allow the pulsator to be rotated at the angular velocity that is lower than the angular velocity of the rotor, wherein the coupler may be configured to be couplable to the spin-drying shaft and the rotor so that the spin-drying shaft is allowed to be rotated at the angular velocity of the rotor.

BRIEF DESCRIPTION OF THE DRAWINGS

These and/or other embodiments of the disclosure will become apparent and more readily appreciated from the following description of the embodiments, taken in conjunction with the accompanying drawings of which.

DETAILED DESCRIPTION

Figure 1:
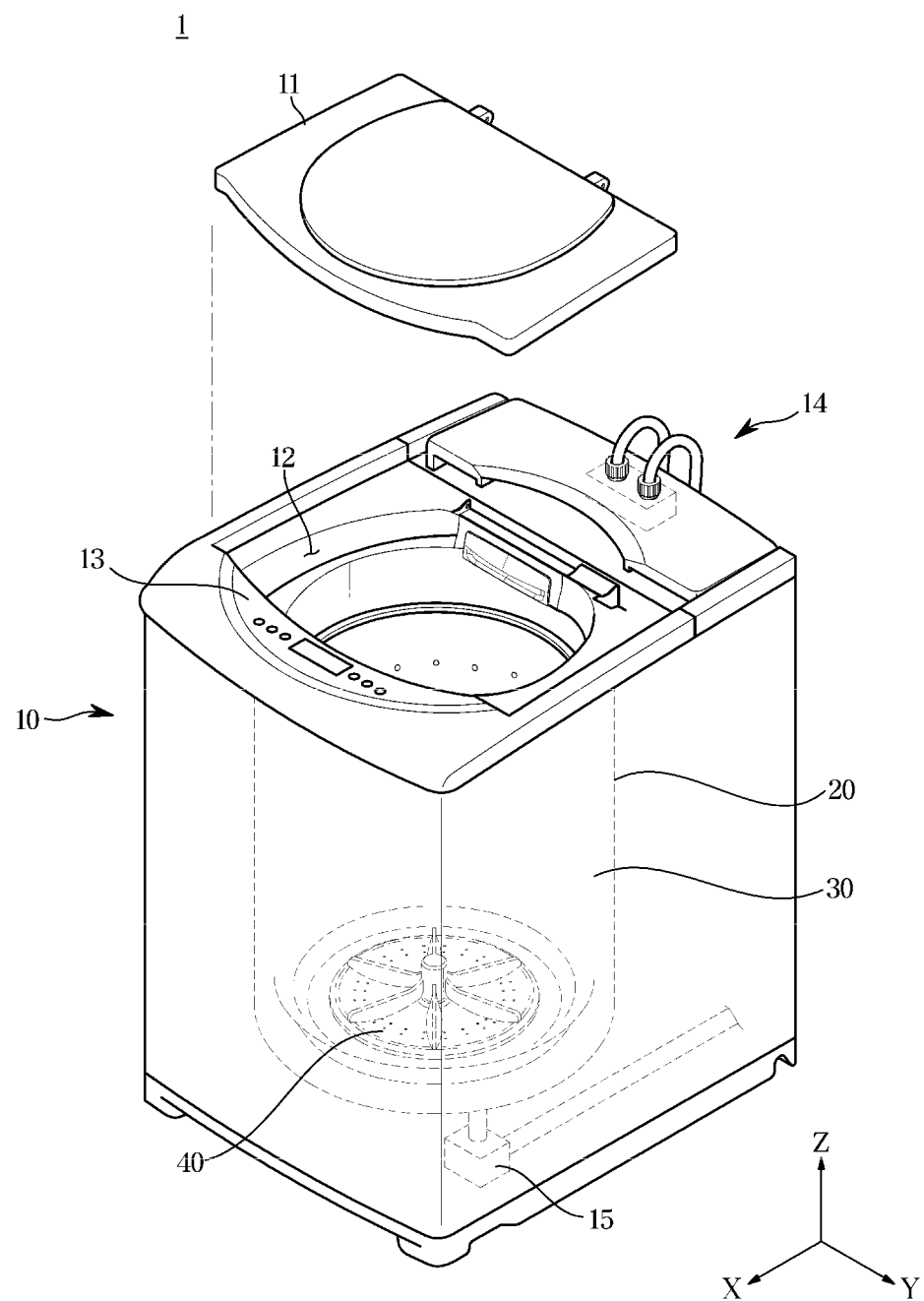
FIG. 1 is a perspective view of a washing machine according to an embodiment of the disclosure.

The various embodiments and the terms used therein are not intended to limit the technology disclosed herein to specific forms, and the disclosure should be understood to include various modifications, equivalents, and/or alternatives to the corresponding embodiments.

In describing the drawings, similar reference numerals may be used to designate similar constituent elements.

A singular expression may include a plural expression unless they are definitely different in a context.

The expressions "A or B," "at least one of A or/and B," or "one or more of A or/and B," A, B or C," "at least one of A, B or/and C," or "one or more of A, B or/and C," and the like used herein may include any and all combinations of one or more of the associated listed items.

The term of "and/or" includes a plurality of combinations of relevant items or any one item among a plurality of relevant items.

Herein, the expressions "a first", "a second", "the first", "the second", etc., may simply be used to distinguish an element from other elements, but is not limited to another aspect (importance or order) of elements.

When an element (e.g., a first element) is referred to as being "(functionally or communicatively) coupled," or "connected" to another element (e.g., a second element), the first element may be connected to the second element, directly (e.g., wired), wirelessly, or through a third element.

In this disclosure, the terms "including", "having", and the like are used to specify features, numbers, steps, operations, elements, elements, or combinations thereof, but do not preclude the presence or addition of one or more of the features, elements, steps, operations, elements, elements, or combinations thereof.

When an element is said to be "connected", "coupled", "supported" or "contacted" with another element, this includes not only when elements are directly connected, coupled, supported or contacted, but also when elements are indirectly connected, coupled, supported or contacted through a third element.

Throughout the description, when an element is "on" another element, this includes not only when the element is in contact with the other element, but also when there is another element between the two elements.

In the following detailed description, the terms of "up and down direction", "lower side", "front and rear direction" and the like may be defined by the drawings, but the shape and the location of the component is not limited by the term.

Particularly, as shown in FIG. 1, a direction, in which an opening of a washing machine 1 is opened, is defined as an upper side, and a lower side, left and right sides, and front and rear sides are defined based on this direction.

Particularly, a +X direction of the X axis is defined as the front side of the washing machine, and a −X direction is defined as the rear side of the washing machine. A +Y direction of the Y axis is defined as the left side of the washing machine, and a −Y direction is defined as the right side of the washing machine. A +Z direction of the Z axis is defined as the upper side of the washing machine, and a −Z direction is defined as the lower side of the washing machine.

Embodiments of the disclosure may provide a coupler moving device capable of moving a coupler while minimizing an increase in height of a clothes treating apparatus. Embodiments of the disclosure may provide a coupler moving device capable of moving a coupler without a direct contact with the coupler, so as to prevent damage to the coupler. Embodiments of the disclosure may provide a first element capable of, during a coupler is moved by a magnetic field to strengthen a force acting on the coupler, forming the magnetic field to correspond to a second element configured to respond to the magnetic field. Embodiments of the disclosure may provide a coupler moving device capable of implementing rotational movement of a coupler.

Reference will now be made in detail to embodiments of the disclosure, examples of which are illustrated in the accompanying drawings.

A clothes treating apparatus 1 may be a device that treats clothes. For example, the clothes treating apparatus 1 may be a washing machine or a dryer. In the disclosure, it is assumed that the clothes treating apparatus 1 is a washing machine and the washing machine is described as an example of the clothes treating apparatus 1. However, it is not limited thereto, and the disclosure may be applied to a dryer.

The washing machine refers to a device that uses a driving force of a motor 61 to stir laundry, wash water, and detergent, which are put into a washing chamber 32 together, so as to perform a washing operation through mutual friction. The laundry may be clothes. When the laundry is clothes, the washing machine may be referred to as a clothes treating apparatus.

The washing machine may be classified into drum washing machines that wash laundry by repeating lifting and dropping of laundry by rotating a drum, and electric washing machines that wash laundry using water current generated by a pulsator when a drum rotates.

The washing machine may be classified according to the direction in which laundry is put into the washing chamber 32. The washing machine may be classified into a front-loading type washing machine in which laundry is received in the washing chamber 32 from the front side, and a top-down loading type washing machine in which laundry is received in the washing chamber 32 from the upper side.

FIG. 1 illustrates a top-loading washing machine, but it is not limited thereto. The disclosure disclosed below may be applied to other types of washing machines.

The washing machine may include a housing forming an exterior and receives various components therein. The housing may be formed in a substantially hexahedral shape.

A control panel including an inputter configured to receive an operation command from a user and a display provided to display operation information of the washing machine may be provided on an upper surface of the housing.

An opening may be formed on the front surface of the housing to allow laundry to be put into the drum. The opening formed on the front surface of the housing may be opened or closed by a door assembly. The door assembly may be rotatably mounted on the front surface of the housing by a hinge member (not shown).

The washing machine may include a detergent supply device. The detergent supply device is a device configured to supply detergent into a tub of the washing machine. FIG. 1 illustrates that the detergent supply device is provided on an upper right side of the washing machine, but it is only an example and is not limited thereto.

Figure 2:
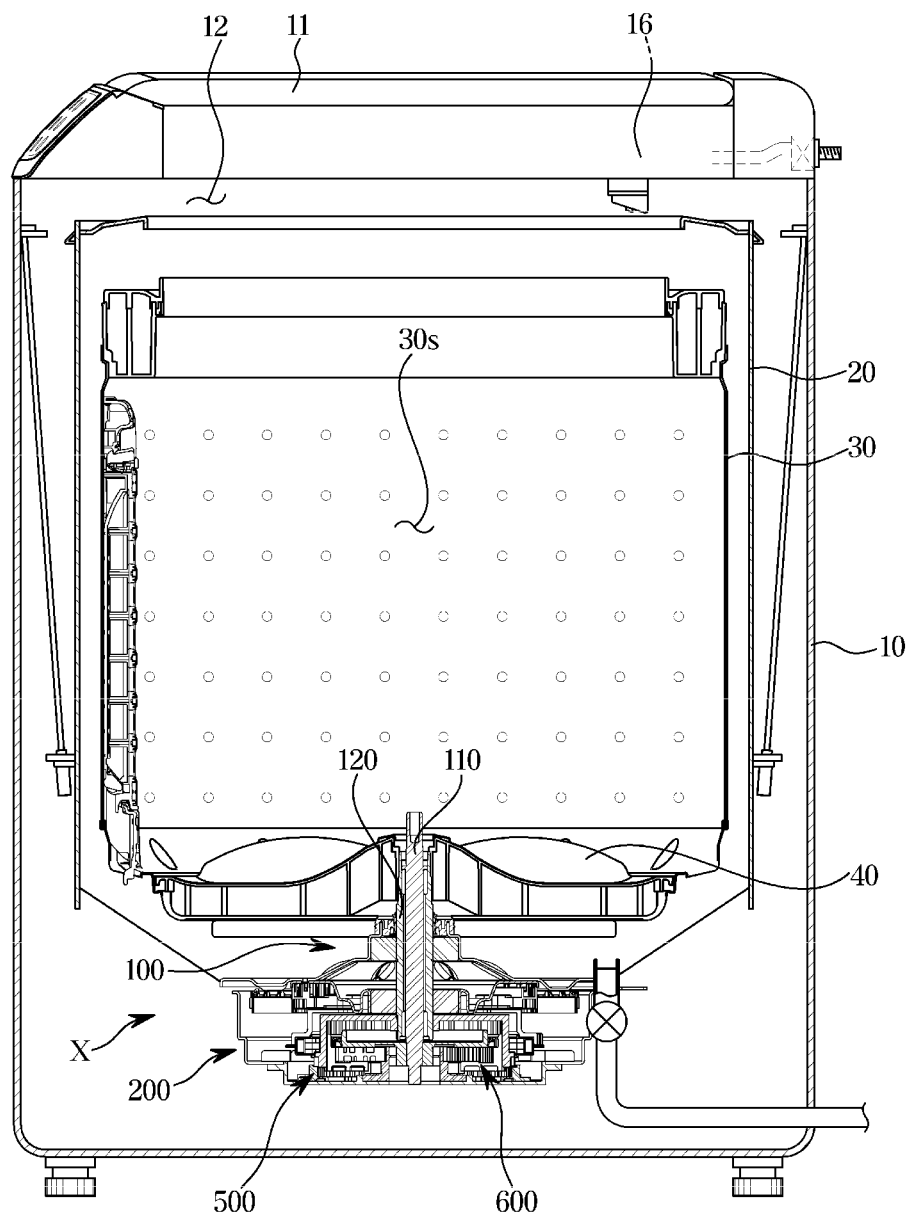
FIG. 2 is a cross-sectional view of the washing machine shown in FIG. 1.

FIG. 1 is a perspective view of the washing machine 1 according to an embodiment of the disclosure. FIG. 2 is a cross-sectional view of the washing machine 1 shown in FIG. 1.

The washing machine 1 will be described with reference to FIGS. 1 and 2.

The washing machine 1 may be a device for washing clothes.

As illustrated in FIG. 1, the washing machine 1 according to an embodiment of the disclosure includes a cabinet 10 forming an exterior, a tub 20 installed inside the cabinet 10 and provided to store wash water, and a drum 30 rotatably installed inside the tub 20.

In addition, the washing machine 1 includes a water supplier 14 for supplying water into the cabinet 10, and a detergent supply device 16 provided to store detergent, and to mix water supplied from the water supplier 14 with detergent and supply the mixed water to the tub 20.

A laundry opening 12 for inserting and withdrawing laundry is formed on an upper portion of the cabinet 10, and an upper cover 11 configured to be opened and closed is installed in the laundry opening 12. A control panel 13 including a plurality of control buttons provided to allow a user to control an operation of the washing machine and a display provided to display an operating state is installed in an upper front portion of the cabinet 10.

The tub 20 for storing wash water and the drum 30 configured to be rotated inside the tub 20 are installed inside the cabinet 10, and a pulsator 40 configured to form a wash water flow is installed in an inner lower part of the drum 30.

A rotating device X configured to drive the drum 30 and the pulsator 40, and a drain device 15 configured to drain wash water are provided below the tub 20 inside the cabinet 10.

After the tub 20 is filled with wash water containing detergent and laundry is stored inside the drum 30, the washing machine 1 may perform washing as the pulsator 40 is repeatedly rotated in forward and reverse directions by the rotating device X.

After the washing, the laundry may be rinsed through an operation that is the same as the above-mentioned operation while water is repeatedly supplied and drained. After the rinsing operation, water is drained through the drain device 15. Further, after the draining operation, the drum 30 is rotated at high speed to spin-dry the laundry.

The water supplier 14 may be installed at an upper rear portion of the cabinet 10.

The washing machine 1 may perform a washing operation and a spin-drying operation.

In other words, the drum 30 may be configured to be rotated inside the tub 20.

The pulsator 40 may be configured to be rotated inside the drum 30.

The washing machine 1 may include the rotating device X. The rotating device X may be configured to rotate the pulsator 40 and the drum 30 described below.

The rotating device X may be directly or indirectly coupled to the pulsator 40 or the drum 30.

The washing machine 1 may include a motor assembly 200. The motor assembly 200 may supply a driving force to rotate the pulsator 40 or the drum 30.

The motor assembly 200 may be directly or indirectly coupled to the pulsator 40 or the drum 30.

The motor assembly 200 may be located on the opposite side of the opening of the washing machine 1 provided to allow clothes to be put therein.

The washing machine 1 may include the pulsator 40. The pulsator 40 may form a water flow inside the drum 30 when the washing machine 1 performs the washing operation.

The pulsator 40 may be located inside the drum 30.

The pulsator 40 may be rotatably coupled to the inside of the drum 30. The pulsator 40 may be rotatable independently of the drum 30.

When the washing machine 1 is in the washing operation, the pulsator 40 may be rotated independently of the drum 30 to form a water flow inside the drum 30. The water flow inside the drum 30 may wash clothes received inside the drum 30.

In this case, it is appropriate that the pulsator 40 has a rotation speed of 50 rpm. The pulsator 40 may be rotated by the motor assembly 200.

When the washing machine 1 is in the spin-drying operation, the pulsator 40 may be rotated together with the drum 30 to allow water of clothes to be moved toward an inner surface of the drum 30. The water in the clothes may be discharged to an outside of the drum 30 through a through-hole 31 located on the drum 30.

In this case, it is appropriate that the pulsator 40 or the drum 30 has a rotation speed of 800 rpm. The pulsator 40 or the drum 30 may be rotated by the motor assembly 200.

The washing machine 1 may include the drum 30. The drum 30 may be rotatable when the washing machine 1 performs the spin-drying operation.

The drum 30 may be positioned while supporting the pulsator 40.

The drum 30 may be rotatably coupled to the pulsator 40. The drum 30 may be rotated together with the pulsator 40.

The drum 30 may receive clothes that are washable.

Figure 3:
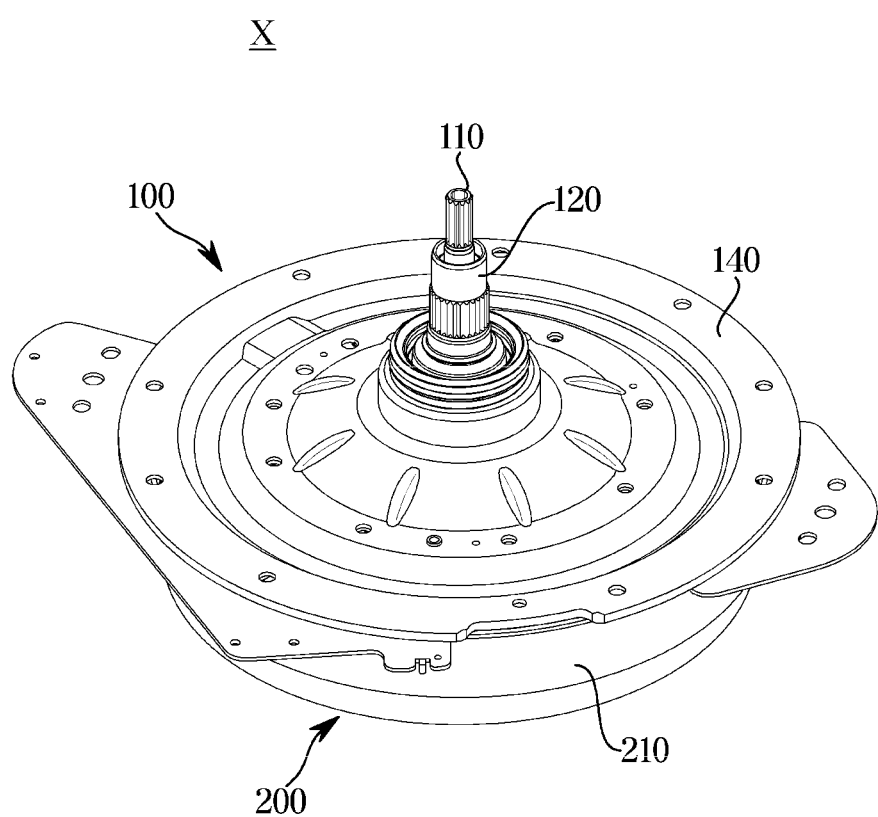
FIG. 3 is a perspective view of a rotating device of the washing machine shown in FIG. 1.

FIG. 3 is a perspective view of the rotating device X of the washing machine 1 shown in FIG. 1.

The rotating device X according to an embodiment of the disclosure will be described with reference to FIG. 3.

The washing machine 1 may include the rotating device X. The rotating device X may be a device that rotates some components of the washing machine 1.

The rotating device X may be configured to rotate the drum 30 (refer to FIG. 2) or the pulsator 40 (refer to FIG. 2).

The rotating device X may include the motor assembly 200. The motor assembly 200 may be configured to obtain a rotational force from electrical energy.

Some components of the motor assembly 200 may be configured to be rotated.

The motor assembly 200 may be indirectly connected to the drum 30 or the pulsator 40. However, it is not limited thereto, and the motor assembly 200 may be directly connected to the drum 30 or the pulsator 40.

The motor assembly 200 may be positioned on a lower side of the rotating device X. Accordingly, the motor assembly 200 may support the rotating device X.

The rotating device X may include a shaft assembly 100. The shaft assembly 100 may be a shaft composite coupled to the motor assembly 200.

The shaft assembly 100 may connect the motor assembly 200 to the drum 30 or the pulsator 40. Accordingly, the rotational force of the motor assembly 200 may be transmitted to the drum 30 or the pulsator 40.

The shaft assembly 100 may be connected to the drum 30. The shaft assembly 100 may be connected to the pulsator 40.

Figure 4:
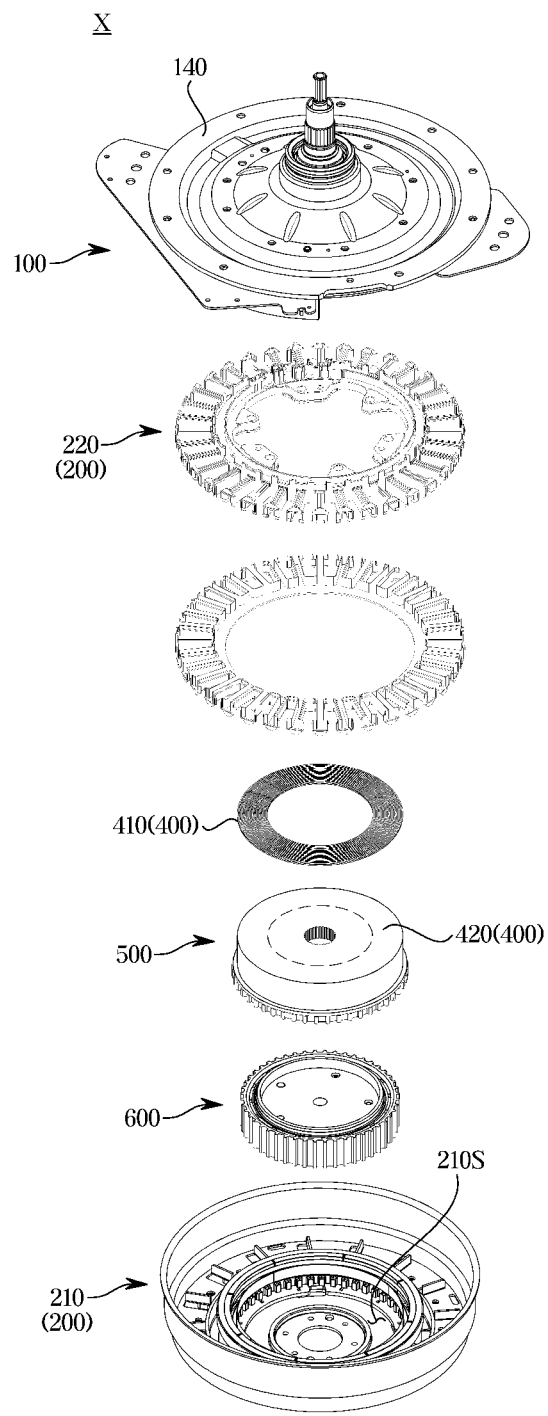
FIG. 4 is an exploded view of the rotating device of the washing machine shown in FIG. 3.

FIG. 4 is an exploded view of the rotating device X of the washing machine 1 shown in FIG. 3.

A configuration of the rotating device X according to an embodiment of the disclosure will be described with reference to FIG. 4.

The rotating device X may include the motor assembly 200.

The motor assembly 200 may include a stator 220 and a rotor 210. In the motor assembly 200, the stator 220 may be configured to be fixed. The rotor 210 may be configured to be rotated in the motor assembly 200.

The stator 220 may include a coil. Current that periodically changes may flow through the coil. As the current, which flows through the coil, changes periodically, a magnetic field may be formed.

The rotor 210 may include a magnet. The magnet of the rotor 210 may be moved by the magnetic field formed by the current flowing through the coil. This is because the magnet of the rotor 210 receives attractive or repulsive force by interacting with the magnetic field formed by the current flowing through the coil.

The magnet of the rotor 210 may be rotated by the current flowing through the coil. As the magnet of the rotor 210 is rotated, the rotor 210 may be rotatable.

A mounting space 210S may be defined in the rotor 210. The rotor 210 may include the mounting space 210S therein.

The rotor 210 may include the mounting space 210S therein and an opening provided to allow a component to be received in the mounting space 210S.

The rotor 210 may have a substantially cylindrical shape with one side open.

The rotor 210 may include a metal or a material having magnetism.

The stator 220 may be positioned to be received in the mounting space 210S. As a result, a volume occupied by the stator 220 and the rotor 210 may be reduced.

At least a portion of the stator 220 may be located in the mounting space 210S. The stator 220 may extend in a circumferential direction based on a spin-drying shaft 120. A stator space 220S may be defined inside the stator 220.

At least a portion of a coupler 500 may be received in the stator space 220S.

A first element 410 may be received in the stator space 220S.

The stator 220 may be located on an upper side relative to a lower surface of the rotor 210.

The rotating device X may include the shaft assembly 100.

The shaft assembly 100 may be positioned to allow the stator 220 to be positioned between the rotor 210 and the shaft assembly 100. The shaft assembly 100 may be positioned above the rotor 210.

The shaft assembly 100 may be positioned to support the stator 220. The shaft assembly 100 may limit an upward-movement of the stator 220.

The shaft assembly 100 may be positioned to cover the opening of the rotor 210. The shaft assembly 100 may prevent foreign substances from being introduced into the rotor 210.

A coupler moving device 400 may have a ring shape.

The rotating device X may include the coupler 500. The coupler 500 may be configured to connect the rotor 210, a reduction gear module 600, and the shaft assembly 100 to each other.

The coupler 500 may be received in the mounting space 210S defined inside the rotor 210. As a result, a volume occupied by the coupler 500 and the rotor 210 may be reduced.

The coupler 500 may be positioned between the shaft assembly 100 and the rotor 210. The coupler 500 may be positioned below the shaft assembly 100. The coupler 500 may be positioned above the rotor 210.

The coupler 500 may be positioned between a support bracket 300 and the rotor 210. At least a portion of the coupler 500 may be received in the support bracket 300. As a result, a volume occupied by the coupler 500 and the support bracket 300 may be reduced.

The coupler 500 may be positioned below the support bracket 300.

As will be described later, the drum 30 may or may not rotate according to the movement of the coupler 500. Accordingly, it may be required to move the coupler 500.

The rotating device X may include the coupler moving device 400. The coupler moving device 400 may be configured to move the coupler 500.

The coupler moving device 400 may move the coupler 500 by forming a magnetic field. In this case, the coupler 500 may include a material that reacts with a magnetic field. However, as will be described later, the coupler moving device 400 may include a configuration configured to respond to a magnetic field coupled to the coupler 500, and thus the coupler 500 may be moved by the corresponding configuration.

However, it is not limited thereto, and there is no limitation in a method in which the coupler moving device 400 moves the coupler 500.

The coupler moving device 400 may include the first element 410 and a second element 420. The first element 410 and the second element 420 may be configured to interact with each other.

The first element 410 may be configured to form a magnetic field.

The first element 410 may conduct electricity. That is, current may flow through the first element 410. When current flows, a magnetic field may be formed around the current, which may be confirmed through Ampere's Law.

The first element 410 may form a magnetic field as current flows through the first element 410.

The second element 420 may be configured to interact with the first element 410. The second element 420 may be configured to interact with the magnetic field when the first element 410 forms a magnetic field. For example, the second element 420 may include a magnet. Alternatively, the second element 420 may include a ferromagnetic material. A ferromagnetic material means a material capable of reacting to magnetism among metals or other materials.

When the first element 410 forms a magnetic field, the second element 420 may be moved toward the first element 410 or moved away from the first element 410.

The first element 410 may be positioned between the stator 220 and the coupler 500. This is to efficiently use the limited space within the rotating device X. When the first element 410 occupies a lot of space in the rotating device X, the overall height of the washing machine 1 may increase. This may cause inconvenience to a user, and thus in order to avoid this, it may be required for the first element 410 to be spaced efficiently within the rotating device X.

The second element 420 may be coupled to the coupler 500.

The second element 420 may be located inside the coupler 500.

The first element 410 may include a component forming a magnetic field. The second element 420 may include a component configured to respond to a magnetic field. However, it is not limited thereto, and the first element 410 may include a component configured to respond to a magnetic field, and the second element 420 may include a component configured to form a magnetic field.

The second element 420 may be positioned to be in contact with the coupler 500 and the second element 420 may be coupled to the coupler 500 on a side facing the first element 410 of the coupler 500 so as to interact with the first element 410.

A receiving space 510S may be defined inside the coupler 500, and the second element 420 may be received in the receiving space 510S.

The first element 410 and the second element 420 will be described later with reference to related drawings.

Figure 5:
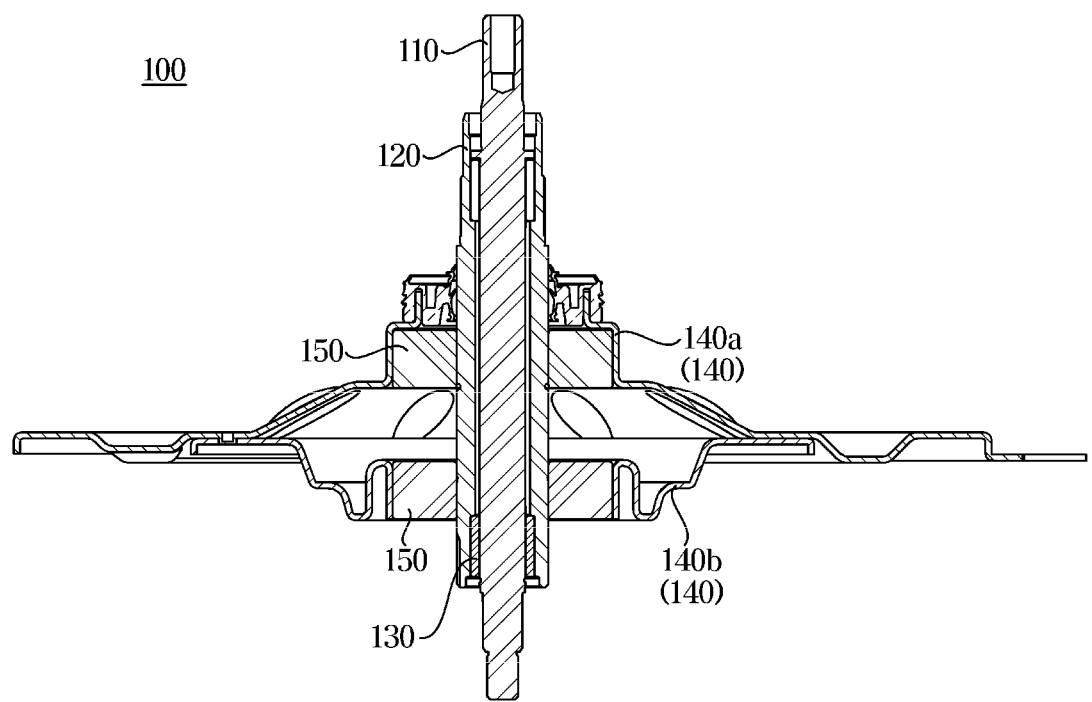
FIG. 5 is a cross-sectional view of a shaft assembly of the washing machine shown in FIG. 4.

FIG. 5 is a cross-sectional view of the shaft assembly 100 of the washing machine 1 shown in FIG. 4.

A configuration of the shaft assembly 100 according to an embodiment of the disclosure will be described with reference to FIG. 5.

The washing machine 1 may include the shaft assembly 100.

The shaft assembly 100 may include a washing shaft 110. The washing shaft 110 may be configured to be coupled to the pulsator 40.

One side of the washing shaft 110 may be coupled to the pulsator 40. The other side opposite to the one side of the washing shaft 110 may be coupled to the reduction gear module 600.

Because the reduction gear module 600 is coupled to the rotor 210, the washing shaft 110 may transfer the rotational force of the rotor 210 to the pulsator 40. That is, when the rotor 210 is rotated, at least a portion of the reduction gear module 600 may be rotated, and when the at least a portion of the reduction gear module 600 is rotated, the washing shaft 110 may be rotated. Because the washing shaft 110 is coupled to the pulsator 40, the washing shaft 110 may rotate the pulsator 40 according to the rotation of the rotor 210.

The washing shaft 110 may be coupled to the pulsator 40 and the reduction gear module 600 to allow the pulsator 40 to be rotated at an angular velocity less than that of the rotor 210.

The washing shaft 110 may be positioned to correspond to a rotation axis of the rotor 210.

The washing shaft 110 may have a shape extending in a longitudinal direction. The pulsator 40 and the reduction gear module 600 may be coupled to both ends of the washing shaft 110 in the longitudinal direction, respectively.

The washing shaft 110 may include a metal material for rigidity. However, it is not limited thereto.

The washing shaft 110 may be formed by a drawing process. However, it is not limited thereto.

The washing shaft 110 may include a washing toothed member 111 at a position to which the reduction gear module 600 is coupled. The washing toothed member 111 may be engaged with the reduction gear module 600.

The washing toothed member 111 may be located on the lower side of the washing shaft 110.

The shaft assembly 100 may include the spin-drying shaft 120. The spin-drying shaft 120 may be configured to be coupled to the drum 30.

The spin-drying shaft 120 may be coupled to the drum 30. One side of the spin-drying shaft 120 may be coupled to the drum 30. The other side of the spin-drying shaft 120 opposite to the one side may be connected to the coupler 500. The coupler 500 may be connectable to the rotor 210.

When the coupler 500 is connected to the rotor 210, the spin-drying shaft 120 may transmit the rotational force of the rotor 210 to the drum 30. That is, when the rotor 210 is rotated, the coupler 500 may be rotated, and when the coupler 500 is rotated, the spin-drying shaft 120 may be rotated. Because the spin-drying shaft 120 is coupled to the drum 30, the spin-drying shaft 120 may rotate the drum 30 according to the rotation of the rotor 210.

The spin-drying shaft 120 may be positioned to correspond to the rotation axis of the rotor 210.

The spin-drying shaft 120 may have a tubular shape including a hollow. The washing shaft 110 may be received in the hollow of the spin-drying shaft 120. Accordingly, the rotation axis of the washing shaft 110 and the spin-drying shaft 120 may be shared.

The spin-drying shaft 120 may have a shape extending in the longitudinal direction. The drum 30 and the coupler 500 may be coupled to both ends of the spin-drying shaft 120 in the longitudinal direction, respectively.

The spin-drying shaft 120 may have a shorter length than the length of the washing shaft 110. Accordingly, the washing shaft 110 may protrude beyond the spin-drying shaft 120. A longitudinal end of the washing shaft 110 may protrude to be coupled to the pulsator 40 and the reduction gear module 600. The spin-drying shaft 120 may be provided outside the washing shaft 110. Accordingly, the spin-drying shaft 120 may be coupled to the drum 30 and the coupler 500 on the outside thereof.

The spin-drying shaft 120 may include a spin-drying toothed member 121. The spin-drying toothed member 121 may be provided to be engaged with the coupler 500.

The spin-drying toothed member 121 may be located on a lower side of the spin-drying shaft 120.

The spin-drying toothed member 121 may be located closer to the drum 30 than a ring toothed member 631.

The shaft assembly 100 may include a shaft bearing 130. The shaft bearing 130 may be configured to reduce friction between the washing shaft 110 and the spin-drying shaft 120.

The shaft bearing 130 may be positioned between the washing shaft 110 and the spin-drying shaft 120.

The shaft bearing 130 may have a ring shape.

The washing shaft 110 may be located inside the shaft bearing 130, and the spin-drying shaft 120 may be located outside the shaft bearing 130.

The shaft bearing 130 may be an oilless bearing. Because it is difficult for lubricating oil to enter between the shafts, an oilless bearing may be used to reduce the friction.

The shaft bearing 130 may be provided in plurality. The plurality of shaft bearings 130 may be provided on the upper and lower sides, respectively. Accordingly, the shaft bearing 130 may stably support the washing shaft 110 and the spin-drying shaft 120.

The shaft assembly 100 may include a cover bracket 140. The cover bracket 140 may cover the opening of the rotor 210.

The cover bracket 140 may be provided to extend radially from the spin-drying shaft 120 or the washing shaft 110.

The cover bracket 140 may cover the opening of the rotor 210 to prevent foreign substances from entering the inside of the rotating device X.

The cover bracket 140 may have irregularities on a surface thereof for rigidity.

The cover bracket 140 may include a metal material. However, it is not limited thereto.

The cover bracket 140 may be formed by a press process. However, it is not limited thereto.

The cover bracket 140 may be provided in plurality. The plurality of cover brackets 140 may include a first cover bracket 140a exposed toward one side, and a second cover bracket 140b positioned on the opposite side of the first cover bracket 140a.

The shaft assembly 100 may include a cover bearing 150. The cover bearing 150 may be configured to allow the cover bracket 140 and the spin-drying shaft 120 to be rotated smoothly with each other.

The cover bearing 150 may be positioned between the cover bracket 140 and the spin-drying shaft 120.

The cover bearing 150 may have a ring shape.

The spin-drying shaft 120 may be positioned inside the cover bearing 150. The cover bracket 140 may be positioned outside the cover bearing 150.

The cover bearing 150 may include a ball bearing.

The cover bearing 150 may be provided in plurality. The plurality of cover bearings 150 may include a cover bearing 150 located between the first cover bracket 140a and the spin-drying shaft 120, and a cover bearing 150 located between the second cover bracket 140b and the spin-drying shaft 120.

Figure 6:
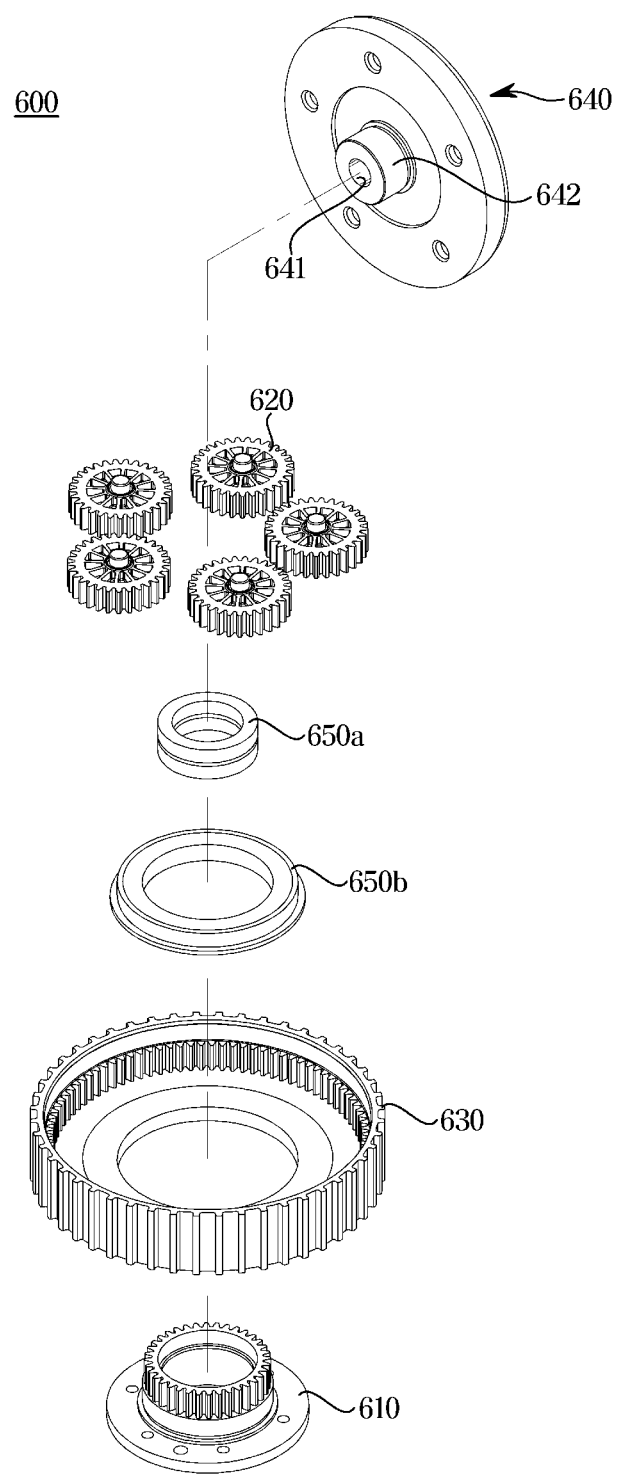
FIG. 6 is an exploded view of a reduction gear module of the washing machine shown in FIG. 4.

FIG. 6 is an exploded view of the reduction gear module 600 of the washing machine 1 shown in FIG. 4.

The reduction gear module 600 according to an embodiment of the disclosure will be described with reference to FIG. 6.

The washing machine 1 may include the reduction gear module 600.

The motor assembly 200 is an electronic component, and has a speed with optimum efficiency. In general, the motor assembly 200 may have optimum efficiency at about 100 rpm.

The pulsator 40 has optimum washing efficiency at about 50 rpm.

It is required for the motor assembly 200 to have the optimal efficiency while maintaining the washing efficiency of the pulsator 40. For this, the reduction gear module 600 may be provided.

The reduction gear module 600 may be coupled to the motor assembly 200. Accordingly, a portion of the reduction gear module 600 may be rotated at a rotation speed corresponding to a rotation speed of the motor assembly 200. That is, the portion of the reduction gear module 600 may be rotated at a rotation speed of about 100 rpm.

The reduction gear module 600 may be coupled to the washing shaft 110. Therefore, when a portion of the reduction gear module 600 is decelerated and rotated, the reduction gear module 600 may rotate the washing shaft 110, which is engaged with the portion, at a speed that is less than the rotation speed of the motor assembly 200. That is, the portion of the reduction gear module 600 may be rotated at a rotation speed of about 50 rpm.

A description thereof will be described in more detail.

The reduction gear module 600 may include a sun gear 610. The sun gear 610 may be a gear that receives the rotational force of the rotor 210.

The sun gear 610 may be coupled to the rotor 210. The sun gear 610 may be rotated at the same rotation speed as the rotation speed of the rotor 210.

A rotation axis of the sun gear 610 may be aligned with the rotation axis of the rotor 210.

The sun gear 610 may have a ring shape on a side coupled to the rotor 210. The ring-shaped part and the rotor 210 may be coupled by a fastening member. The ring shape may be located on the lower side of the sun gear 610.

The sun gear 610 may have a shape extending toward a carrier 640 from the ring shape. A toothed member may be positioned outside the extending shape.

The reduction gear module 600 may include a pinion gear 620. The pinion gear 620 may be a gear that surrounds the sun gear 610 and is engaged with the sun gear 610.

The pinion gear 620 may be a spur gear.

A toothed member may be located on an outside of the pinion gear 620. The pinion gear 620 may be engaged with the sun gear 610.

The pinion gear 620 may be rotated as the sun gear 610 is rotated.

The pinion gear 620 may be moved along an outer circumference of the sun gear 610 or the pinion gear 620 may be rotated while a position thereof is fixed.

The pinion gear 620 may be provided in plurality. The plurality of pinion gears 620 may be arranged at equal intervals around the sun gear 610. However, it is not limited thereto.

The reduction gear module 600 may include a ring gear 630. The ring gear 630 may be a gear surrounding the pinion gear 620.

A rotation axis of the ring gear 630 may be aligned with the rotation axis of the rotor 210.

The ring gear 630 may be engaged with the pinion gear 620. The ring gear 630 may include a toothed member that is positioned inside the ring gear 630 and engaged with the pinion gear 620.

The ring gear 630 may have a ring shape.

The ring gear 630 may include a toothed member that is positioned inside the ring gear 630 and engaged with the pinion gear 620.

Figure 8:
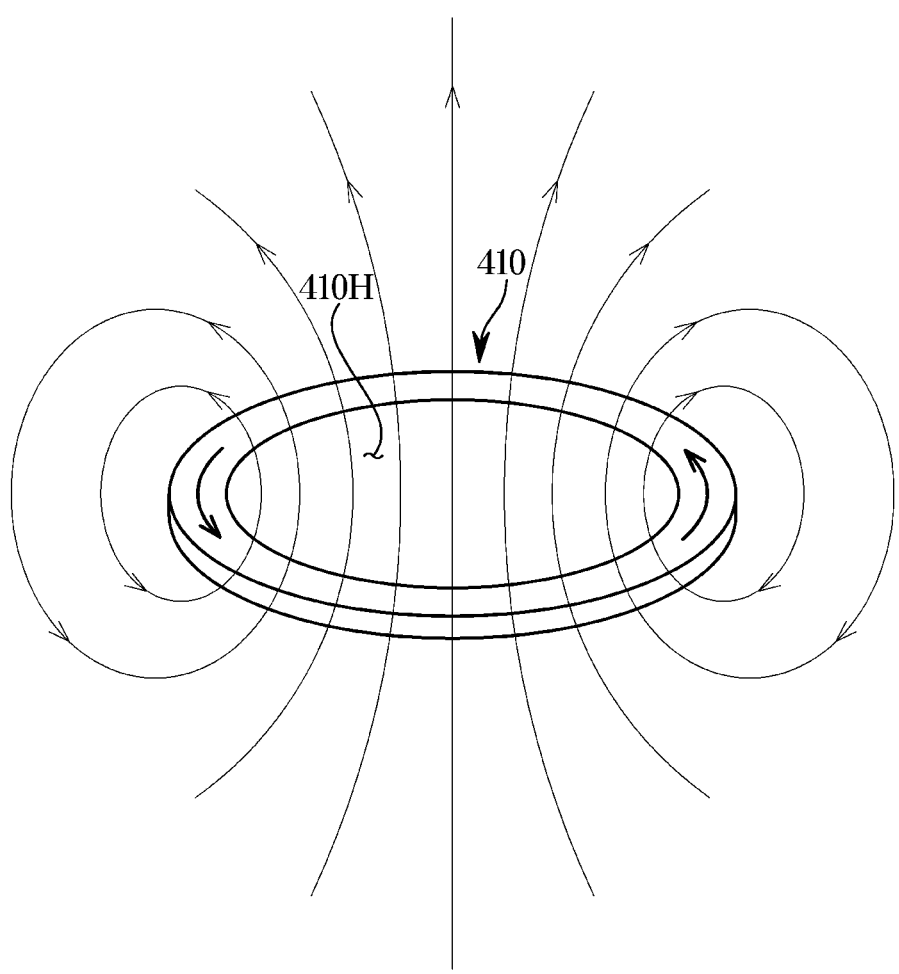
FIG. 8 is a conceptual diagram illustrating a first element of the washing machine shown in FIG. 4 according to an embodiment of the disclosure.

The ring gear 630 may include the ring toothed member 631 that is positioned outside the ring gear 630 and engaged with the coupler 500 (refer to FIG. 8).

The ring gear 630 may include a plastic material. However, it is not limited thereto.

The ring gear 630 may be formed by injection molding.

The reduction gear module 600 may include the carrier 640. The carrier 640 may be configured to be coupled to the washing shaft 110.

A rotation axis of the carrier 640 may be aligned with the rotation axis of the rotor 210.

The carrier 640 may be coupled to the pinion gear 620. The pinion gear 620 may be arranged in a circumferential direction with respect to the rotation axis.

When a plurality of pinion gears 620 is provided, each of the plurality of pinion gears 620 may be coupled to the carrier 640 at a rotation axis of the plurality of pinion gears 620.

The carrier 640 may be rotated along with the pinion gear 620 when the pinion gear 620 is moved. As the carrier 640 is rotated, the carrier 640 may rotate the washing shaft 110.

The carrier 640 may include a carrier toothed member 641 engaged with the washing toothed member 111 of the washing shaft 110. The carrier toothed member 641 may be provided to extend in an up and down direction.

The carrier 640 may include a carrier toothed forming member 642 protruding toward the inside of the ring gear 630. Accordingly, the washing shaft 110 may be inserted into the carrier toothed forming member 642. As a contact area between the washing shaft 110 and the carrier toothed forming member 642 increases, frictional force may increase and thus separation may be prevented.

The carrier toothed member 641 may be provided on the carrier toothed forming member 642. The carrier toothed member 641 may be formed inside the carrier toothed forming member 642.

The reduction gear module 600 may include a gear bearing 650. The gear bearing 650 may be a component that reduces friction between the sun gear 610 and other components in contact with the sun gear 610.

The gear bearing 650 may be provided in plurality. The plurality of gear bearings 650 may include a first gear bearing 650a positioned between the sun gear 610 and the carrier 640. The plurality of gear bearings 650 may include a second gear bearing 650b positioned between the sun gear 610 and the ring gear 630.

In summary, the reduction gear module 600 may include the sun gear 610 coupled to the rotor 210 and rotatable by the rotor 210. The reduction gear module 600 may include the plurality of pinion gears 620 engaged with the sun gear 610 to be rotated around the sun gear 610. The reduction gear module 600 may include the ring gear 630 engaged with the outside of the plurality of pinion gears 620 so as to be relatively rotated with the plurality of pinion gears 620. The ring gear 630 may include the ring toothed member 631 engaged with a second toothed member 530. The reduction gear module 600 may include the carrier 640 coupled to each of the plurality of pinion gears 620 on the rotation axis of each of the plurality of pinion gears 620, and coupled to the washing shaft 110 to be rotated together.

It will be described with an assumption that the sun gear 610 is rotated counterclockwise. In a case in which the sun gear 610 is rotated clockwise, it will be understood that the rotation direction is reversed in the following description.

The sun gear 610 may be rotated counterclockwise. Because the sun gear 610 is rotated by the rotor 210, the rotor 210 may be rotated counterclockwise. The sun gear 610 may be rotated counterclockwise by the rotation of the rotor 210.

The pinion gear 620 engaged with the sun gear 610 may be rotated by the rotation of the sun gear 610.

It is assumed that the ring gear 630 is in a fixed state. The ring gear 630 may be configured to be rotated, but it is assumed that the ring gear 630 is in a fixed state according to an embodiment.

Because the ring gear 630 is fixed, the pinion gear 620 may be moved between the ring gear 630 and the sun gear 610 according to the rotation of the sun gear 610.

Particularly, when the sun gear 610 is rotated counterclockwise, the pinion gear 620 engaged with the sun gear 610 may be rotated clockwise. While being rotated clockwise, the pinion gear 620 may be moved counterclockwise around the sun gear 610.

The carrier 640 connected to the pinion gear 620 may be rotated counterclockwise when the pinion gear 620 is moved counterclockwise.

When the carrier 640 is rotated counterclockwise, the washing shaft 110 connected to the carrier 640 may be rotated counterclockwise. The washing shaft 110 may be rotated by the carrier 640.

The reduction gear module 600 may be a kind of planetary gear.

In the above-mentioned description, the rotation speed of the ring gear 630 is greater than the rotation speed of the carrier 640. In other words, the rotation speed input to the ring gear 630 is reduced as being output from the carrier 640. That is, it is decelerated.

When a speed input to the ring gear 630 is output from the carrier 640, a rate of deceleration is as follows.

$$\frac{1}{\frac{\text{the number of teeth of pinion gear}}{\text{the number of teeth of sun gear}} + 1}$$

The deceleration function of the reduction gear module 600 has been described above. However, in addition to the deceleration of the washing shaft 110, it is required for the washing shaft 110 to be rotated together with the spin-drying shaft 120 when the washing machine 1 performs the spin-drying operation. The reduction gear module 600 may also perform a function of guiding the rotation of the washing shaft 110. This will be described later with reference to the related drawings.

Figure 7:
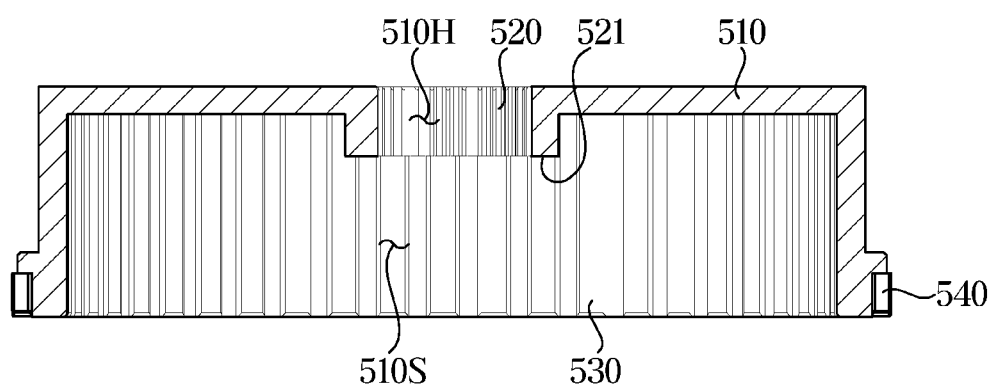
FIG. 7 is a cross-sectional view of a coupler of the washing machine shown in FIG. 4.

FIG. 7 is a cross-sectional view of the coupler 500 of the washing machine 1 shown in FIG. 4.

The coupler 500 according to an embodiment of the disclosure and a configuration related thereto will be described with reference to FIG. 7.

The washing machine 1 may include the coupler 500.

A rotation axis of the coupler 500 may be aligned with the rotation axis of the rotor 210.

The coupler 500 may be a component configured to control the rotation of the washing shaft 110 and the spin-drying shaft 120 by being coupled or not being coupled to the spin-drying shaft 120 (refer to FIG. 4), the reduction gear module 600 (refer to FIG. 4) and the rotor 210.

The coupler 500 may be coupled to the spin-drying shaft 120 and the rotor 210 so as to rotate the spin-drying shaft 120 at the angular velocity of the rotor 210, and the coupler 500 may include the receiving space 510S formed therein to receive the reduction gear module 600.

The coupler 500 may be provided to be received in the mounting space 210S of the motor assembly 200.

The coupler 500 may include a coupler body 510 defining an exterior.

The coupler body 510 may have a substantially cylindrical shape with one side open.

The coupler body 510 may include an upper wall on the upper side thereof and an opening on the lower side.

The receiving space 510S may be defined inside the coupler body 510. The receiving space 510S may be a space defined by the upper wall of the coupler body 510 located on the upper side and the side wall of the coupler body 510. The reduction gear module 600 may be received in the receiving space 510S. Accordingly, a volume occupied by the reduction gear module 600 and the coupler body 510 may be reduced.

The coupler body 510 may include a spin-drying shaft hole 510H on the upper wall. A center of the spin-drying shaft hole 510H may be positioned to allow the rotation axis of the coupler 500 to pass through.

The coupler main body 510 may include a toothed forming member 521 defining the spin-drying shaft hole 510H. The toothed forming member 521 may be provided to allow a first toothed member 520, which is to be described later, to be located on an inside thereof.

The toothed forming member 521 may have a ring shape. The spin-drying shaft hole 510H may be defined at the center of the ring shape of the toothed forming member 521.

The toothed forming member 521 may extend along the spin-drying shaft 120. The toothed forming member 521 may extend from the coupler body 510. The toothed forming member 521 may protrude downward from the coupler body 510. As a result, a contact area between the spin-drying shaft 120 and the first toothed member 520 is increased, and thus the spin-drying shaft 120 may be prevented from being separated from the coupler 500.

The coupler 500 may include the first toothed member 520. The first toothed member 520 may be a toothed member configured to be coupled to the spin-drying shaft 120.

The first toothed member 520 may be engaged with the spin-drying toothed member 121 provided on the spin-drying shaft 120. When the coupler 500 is rotated, the first toothed member 520 may be rotated. Accordingly, the spin-drying toothed member 121 engaged with the first toothed member 520 may be rotated. As the spin-drying toothed member 121 is rotated, the spin-drying shaft 120 may be rotated.

The first toothed member 520 may be located on the coupler body 510. The first toothed member 520 may be located on the upper side of the coupler body 510. The first toothed member 520 may be arranged along an edge of the spin-drying shaft hole 510H defined on the coupler body 510. The first toothed member 520 may be arranged along an outer surface of the spin-drying shaft hole 510H defined on the coupler body 510.

The first toothed member 520 may extend along the longitudinal direction of the spin-drying shaft 120. The first toothed member 520 may extend in the up and down direction.

The first toothed member 520 may extend from the coupler body 510 along the spin-drying shaft 120 to increase a contact area with the spin-drying shaft 120.

The coupler 500 may include the second toothed member 530. The second toothed member 530 may be a toothed member connected to the ring gear 630 (refer to FIG. 7).

The second toothed member 530 may be engaged with the ring toothed member 631. When the coupler 500 is rotated, the second toothed member 530 may be rotated. Accordingly, the ring toothed member 631 engaged with the second toothed member 530 may be rotated. As the ring toothed member 631 is rotated, the ring gear 630 may be rotated.

The second toothed member 530 may be in contact with the ring toothed member 631. The second toothed member 530 may be configured to allow the coupler 500 to be in contact with the ring gear 630. Because the coupler 500 is connected to the drum 30 through the spin-drying shaft 120, the inertia of the drum 30 may limit the movement of the ring gear 630. Accordingly, in order to prevent the movement of the ring gear 630, it is possible to transmit the inertia of the drum 30 to the ring gear 630.

That is, the coupler 500 may be coupled to the spin-drying shaft 120 coupled to the drum 30, and the ring gear 630 to limit the movement of the ring gear 630 while the washing machine 1 performs the washing operation.

The second toothed member 530 may be located inside the coupler body 510. The second toothed member 530 may be located on an outer surface of the receiving space 510S defined in the coupler 500. The second toothed member 530 may be located inside the sidewall of the coupler body 510. The second toothed member 530 may extend downward from the upper wall inside the coupler body 510.

The second toothed member 530 may be located inside the coupler body 510 to allow the ring gear 630 to be received in the receiving space 510S.

The coupler 500 may include a third toothed member 540. The third toothed member 540 may be connected to the rotor 210 (refer to FIG. 4).

The third toothed member 540 may be engaged with a rotor toothed member 211 (refer to FIG. 4) included in the rotor 210. When the rotor 210 is rotated, the rotor toothed member 211 may be rotated. When the rotor toothed member 211 is rotated, the third toothed member 540 engaged with the rotor toothed member 211 may be rotated. When the third toothed member 540 is rotated, the coupler 500 may be rotated. When the coupler 500 is rotated, the spin-drying shaft 120 may be rotated, and thus the drum 30 may be rotated.

The rotor toothed member 211 may be located farther from the drum 30 than the ring toothed member 631.

However, the third toothed member 540 may or may not be engaged with the rotor toothed member 211. The coupler 500 may or may not be rotated by the third toothed member 540. When the coupler 500 is rotated or is not rotated, the drum 30 may or may not be rotated.

The third toothed member 540 may be located on an outer surface of the coupler body 510. The third toothed member 540 may be located on the outer surface of the sidewall of the coupler body 510. The third toothed member 540 may be located on a lower side of the sidewall of the coupler body 510. The third toothed member 540 may be arranged to extend circumferentially along the coupler body 510.

The third toothed member 540 may be positioned outside the coupler body 510 so as to be engaged with the rotor 210 on the outside of the coupler body 510 while the washing machine 1 performs the spin-drying operation.

In summary, the coupler 500 may include the first toothed member 520 engaged with the spin-drying shaft 120 when the washing machine 1 is in the spin-drying operation, the second toothed member 530 engaged with the reduction gear module 600 when the washing machine 1 is in the spin-drying operation, and the third toothed member 540 engaged with the rotor 210 when the washing machine 1 is in the spin-drying operation.

As the coupler 500 is positioned in a second position while the washing machine 1 performs the washing operation, the first toothed member 520 may be coupled to the spin-drying toothed member 121, the second toothed member 530 may be coupled to the ring toothed member 631, and the third toothed member 540 may be disengaged from the rotor toothed member 211.

As the coupler 500 is positioned in a first position farther from the drum 30 than the second position while the washing machine 1 performs the spin-drying operation, the first toothed member 520 may be coupled to the spin-drying toothed member 121, the second toothed member 530 may be coupled to the ring toothed member 631, and the third toothed member 540 may be coupled to the rotor toothed member 211.

The rotor 210 may be located on the side of a direction in which the coupler 500 is moved with respect to the coupler 500.

The first element 410 may be arranged between the coupler 500 and the tub 20 to be located on a direction opposite to the direction, in which the coupler 500 is moved with respect to the coupler 500, so as to prevent interference between the coupler 500 and the rotor 210.

Figure 9:
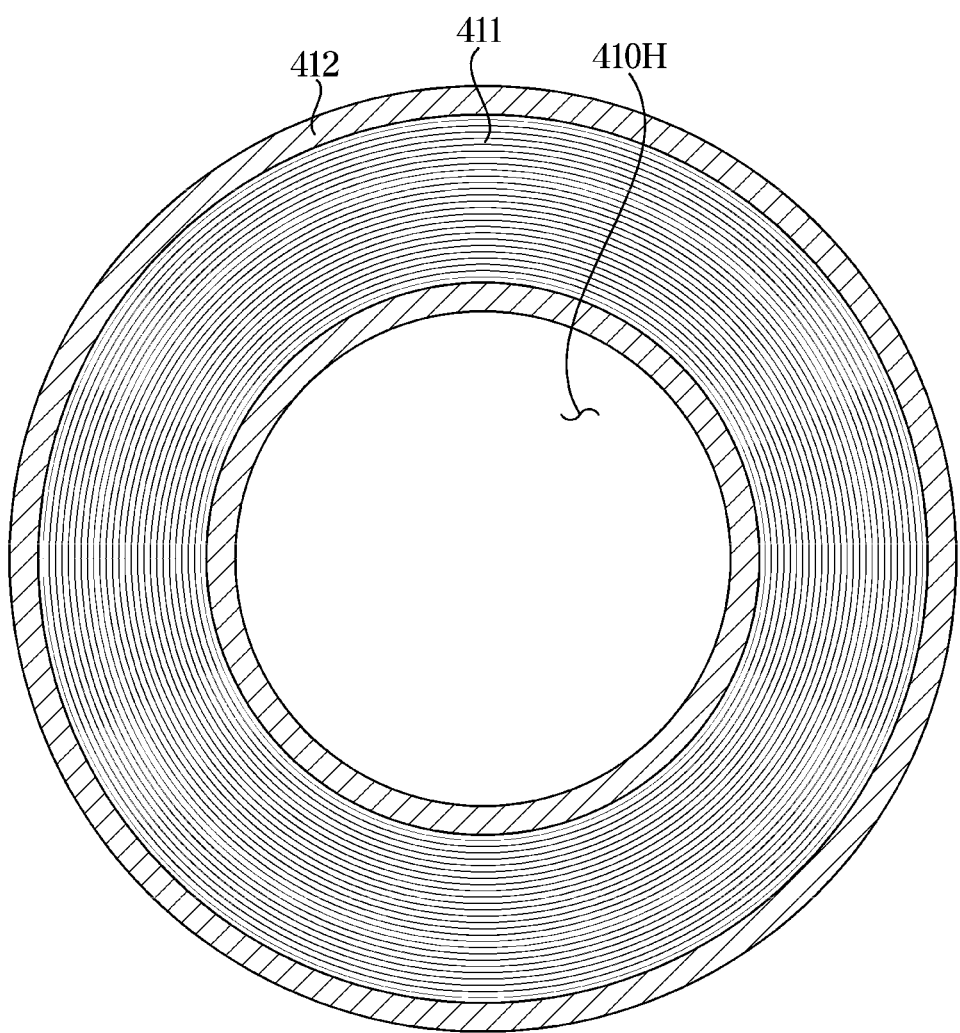
FIG. 9 is a cross-sectional view illustrating the first element of the washing machine shown in FIG. 8.
Figure 10:
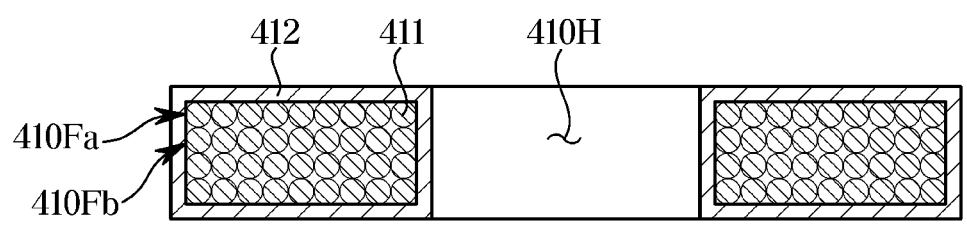
FIG. 10 is a cross-sectional view illustrating the first element of the washing machine shown in FIG. 8.

FIG. 8 is a conceptual diagram illustrating the first element 410 of the washing machine 1 shown in FIG. 4. FIG. 9 is a cross-sectional view illustrating the first element 410 of the washing machine 1 shown in FIG. 8. FIG. 10 is a cross-sectional view illustrating the first element 410 of the washing machine 1 shown in FIG. 8.

The first element 410 according to an embodiment of the disclosure will be described with reference to FIGS. 8 to 10.

A position of the first element 410 may switch with a position of the second element 420 interacting with the first element 410. The first element 410 may form a magnetic field. However, it is not limited thereto, and the second element 420 may form a magnetic field. Hereinafter for convenience of description, an example in which the first element 410 forms a magnetic field will be described. When the second element 420 is configured to form a magnetic field, it will be understood that the first element 410 is changed to the second element 420.

Additionally, the second element 420 may be integrally formed with the coupler 500. In other words, the coupler 500 may be configured to interact with the first element 410. However, for convenience of description, it is assumed that there is an interaction between the first element 410 and the second element 420 in the following description.

The first element 410 may form a magnetic field. For example, the first element 410 may be a magnet. However, in the following description, the first element 410 may form a magnetic field as current flows through the first element 410.

As illustrated in FIG. 8, while current flows through the first element 410, a magnetic field may be formed around the first element 410. The first element 410 may be configured to form a magnetic field.

When the first element 410 forms a magnetic field as current flows, the interaction between the first element 410 and the second element 420 may be controlled by controlling an intensity and direction of the current.

A direction of the magnetic field may be determined by a direction of the current flowing in the first element 410, which may be confirmed through Ampere's Law. When the current flows in a counterclockwise direction, a magnetic field may be formed toward an upper side based on a plane in which the current flows. When the current flows in a clockwise direction, the direction in which the magnetic field is formed is opposite to when the current flows in a counterclockwise direction.

The second element 420 may be close to or away from the first element 410 by changing the direction of the current flowing in the first element 410.

The first element 410 may have a ring shape. The first element 410 may have a shape of a rotating body that is formed by rotating around an imaginary axis. The first element 410 may have a rotationally symmetrical shape about an imaginary axis.

When the first element 410 has a ring shape, the strongest magnetic field may be formed at a position through which an imaginary axis passes.

A shaft through-hole 410H may be provided in the first element 410. The shaft through-hole 410H may be defined by the first element 410. The shaft through-hole 410H may be a hole provided at a position corresponding to a center of the rotation axis of the first element 410.

The first element 410 may be provided to surround the shaft through-hole 410H. When viewed from a plane, the first element 410 may surround the shaft through-hole 410H.

The first element 410 may include a coil 411. The coil 411 may be configured to allow current to flow.

The first element 410 may include the coil 411 configured to form a magnetic field in response to the application of the current.

In order to move in a state of not being in contact with the first element 410, the second element 420 may be moved to be close to or away from the first element 410 by a magnetic field formed by the coil 411.

The coil 411 may include a copper material. However, it is not limited thereto, and the coil 411 may include a material through which current flows. For example, the coil 411 may include a metal material.

The coil 411 may be formed as a metal wire is wound. The coil 411 may be provided as a metal wire is wound around an imaginary axis.

The coil 411 may have a circular cross section. However, it is not limited thereto.

The first element 410 may include a coil housing 412. The coil housing 412 may be provided to receive the coil 411 inside.

The coil housing 412 may be configured to protect the coil 411. The coil housing 412 may be configured to cover the coil 411.

The coil housing 412 may be configured to be difficult to deform. The coil housing 412 may support the coil 411.

The coil housing 412 may reduce an impact applied to the coil 411.

The coil housing 412 may be provided to surround the coil 411. The coil housing 412 may be located outside the coil 411. The coil 411 may be located inside the coil housing 412.

The coil housing 412 may include a space defined therein to receive the coil 411.

The coil housing 412 may have a rotationally symmetrical shape about an imaginary axis. The coil housing 412 may have a shape that is formed by rotating a figure on a plane around an imaginary axis.

The coil housing 412 may have a shape corresponding to the coil 411. Accordingly, the coil housing 412 may limit the movement of the coil 411.

The coil 411 may be wound and positioned within the coil housing 412.

The coil 411 may be stacked and positioned within the coil housing 412.

Particularly, referring to FIG. 10, the coil 411 may include a first coil layer 410Fa. The coil 411 may include a second coil layer 410Fb positioned adjacent to the first coil layer 410Fa.

When the coil 411 is cut in a plane including an axis extending in the up and down direction, a cross section of each coil 411 provided on the cross section may be aligned in rows and columns.

As for the cross section of the coil 411, a length in a horizontal direction may be greater than a length in a vertical direction. This will be described in more detail with reference to the following drawings.

Figure 11:
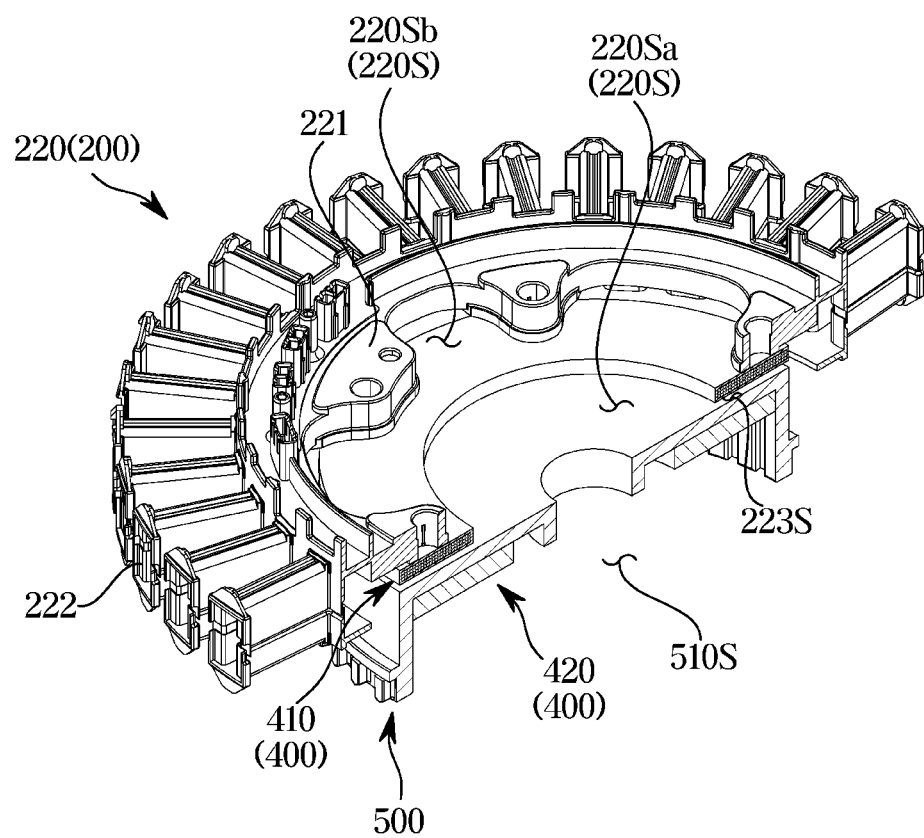
FIG. 11 is a cross-sectional perspective view illustrating the first element of the washing machine shown in FIG. 8 and a configuration around the first element according to an embodiment of the disclosure.

FIG. 11 is a cross-sectional perspective view illustrating the first element 410 of the washing machine 1 shown in FIG. 8 and a configuration around the first element.

A positional relationship of the first element 410 according to an embodiment of the disclosure will be described with reference to FIG. 11.

The rotating device X may include the first element 410 and the second element 420.

The rotating device X may include the stator 220.

The rotating device X may include the coupler 500.

The stator 220 and the coupler 500 may be spaced apart from each other. A gap space 223S may be defined between the stator 220 and the coupler 500. The coupler 500 may be positioned below the stator 220.

The first element 410 may be positioned in the gap space 223S. The first element 410 may be received in the gap space 223S. Accordingly, even when the first element 410 is located in the rotating device X, the first element 410 may occupy less space. It is appropriate that the first element 410 occupies less space. Because the first element 410 occupies less space, the height of the washing machine 1 may not be increased. An increase in the height of the washing machine 1 may give a burden to a user, and thus it is beneficial to prevent the increase.

Accordingly, the first element 410 may efficiently use a space.

The gap space 223S may be defined in such a way that a length in a left and right direction is greater than a length in the vertical direction.

The coupler 500 may be moved in the up and down direction, which is described later. The coupler 500 may be moved in the gap space 223S. The first element 410 may be positioned to prevent contact with the coupler 500 despite the movement of the coupler 500. The first element 410 may be positioned so as not to interrupt the movement of the coupler 500.

The shape of the first element 410 may correspond to the gap space 223S. The first element 410 may be positioned to correspond to a space from the maximum height to the stator 220 when the coupler 500 is maximally raised.

The first element 410 may be coupled to the stator 220. The first element 410 may be coupled to the lower side of the stator 220.

The second element 420 may be located in the receiving space inside the coupler 500. The second element 420 may be coupled to the inner upper portion of the coupler 500. When the second element 420 is located in the receiving space 510S, a volume occupied by the second element 420 may not exceed the volume that is occupied by the coupler 500, and thus space efficiency may be increased.

The second element 420 may be positioned to correspond to the first element 410.

Additionally, the stator 220 may include a protrusion. The protrusion 222 may protrude toward the rotor 210.

The stator 220 may interact with the rotor 210 by a magnetic field. Because the protrusion 222 is positioned close to the rotor 210, the interaction with the rotor 210 may occur by the protrusion 222.

The protrusion 222 may be provided in plurality.

The plurality of protrusions 222 may be arranged in a radial direction of a circle.

The stator 220 may include a core member. The core member 221 may be provided inside the stator 220.

The core member 221 may be configured to support the protrusion 222. The core member 221 may extend from the protrusion 222.

The core member 221 may be located inside the plurality of protrusion 222s.

The core member 221 may have a substantially ring shape.

The core member 221 may have a shape extending in a radial direction.

The stator space 220S may be provided inside the core member. The stator space 220S may be defined by the core member.

The spin-drying shaft 120 may be positioned to pass through the stator space 220S.

The first element 410 may be configured to be wound in a circumferential direction with respect to the spin-drying shaft 120.

The core member 221 may be configured to surround the stator space 220S.

The stator space 220S may include a central space 220Sa and a branch space 220Sb. The central space 220Sa may have a circular cross section. The branch space 220Sb may extend from the central space 220Sa.

Figure 12:
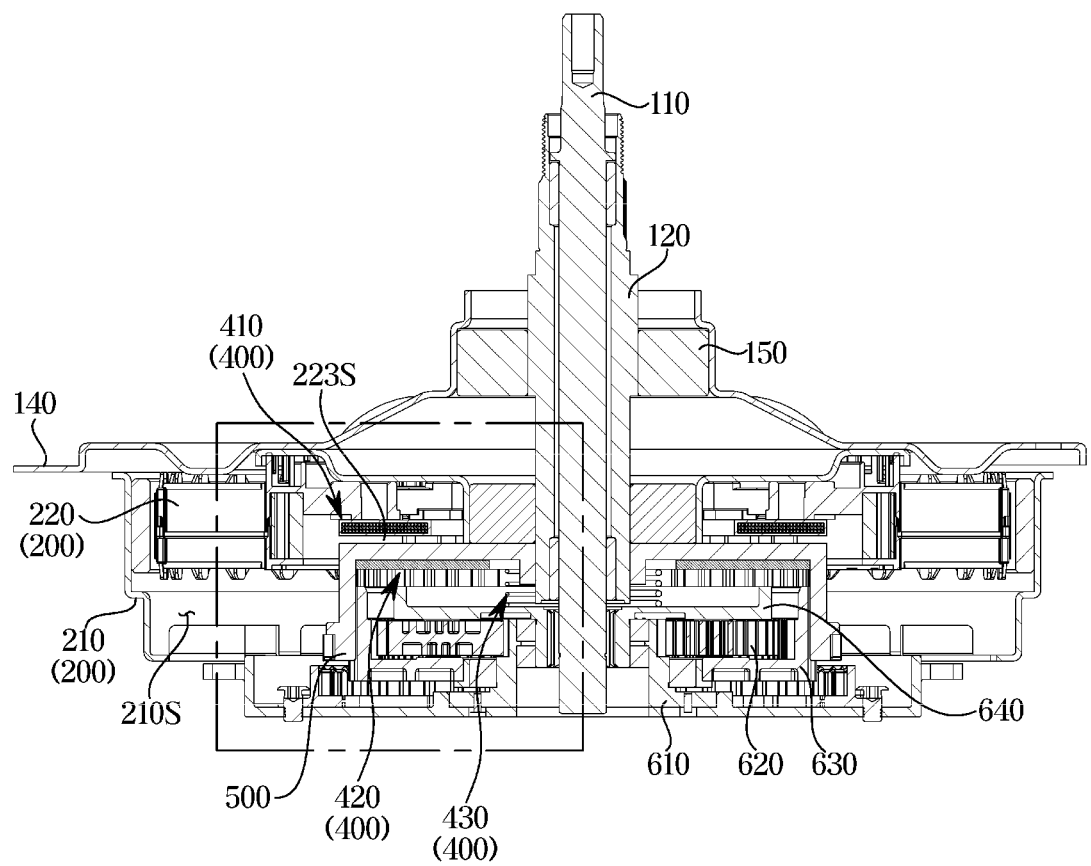
FIG. 12 is a cross-sectional view of the rotating device of the washing machine shown in FIG. 3.
Figure 13:
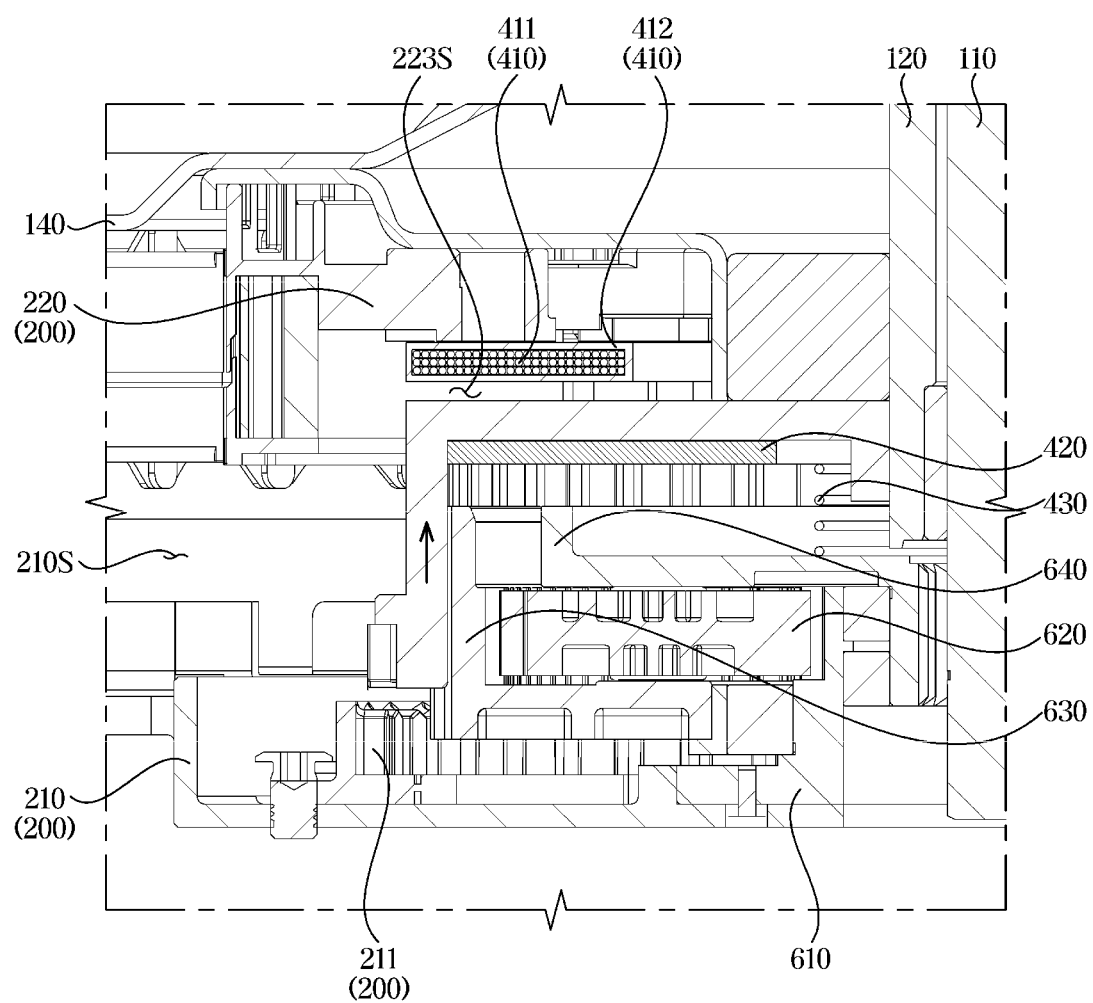
FIG. 13 is an enlarged view of a part of the rotating device of the washing machine shown in FIG. 12.
Figure 14:
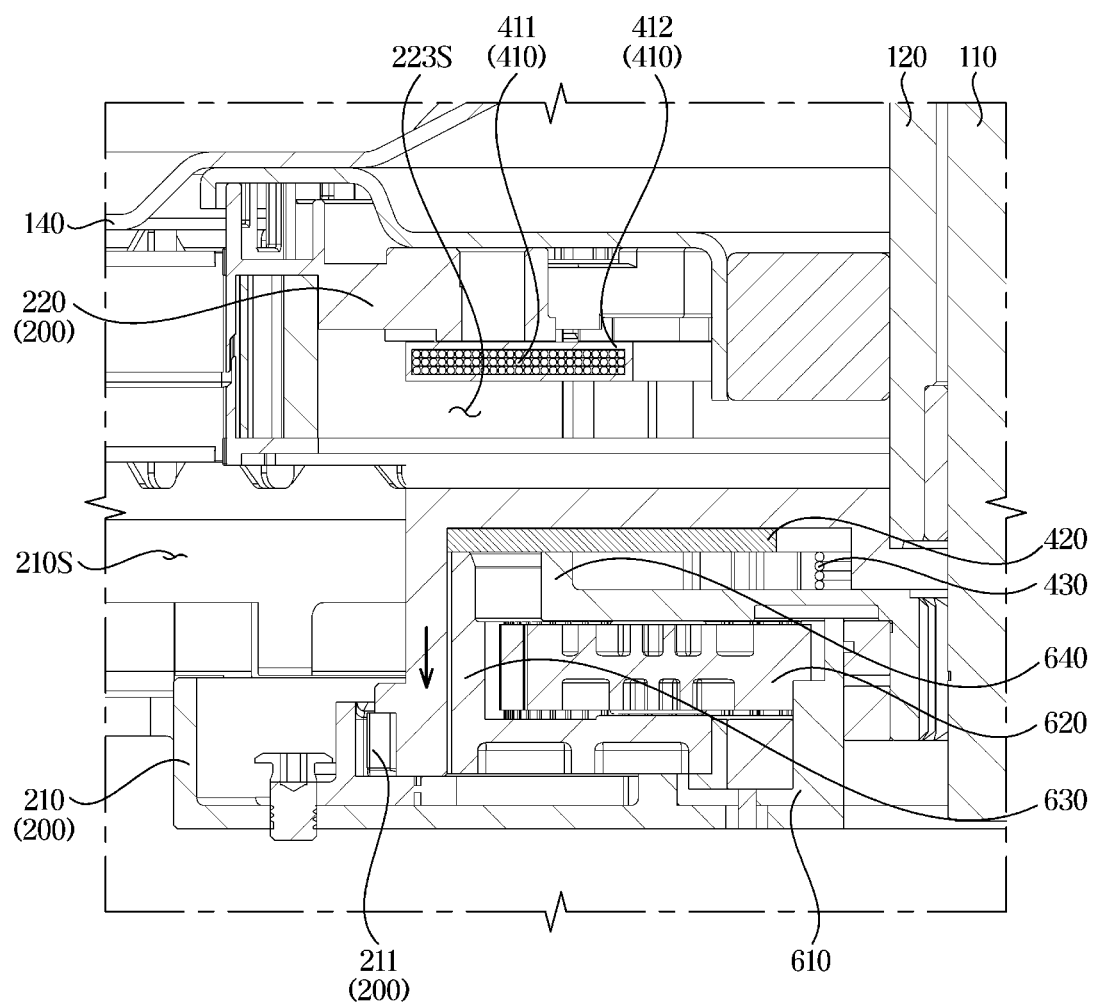
FIG. 14 is an enlarged view illustrating a state in which the coupler of the washing machine shown in FIG. 13 is moved to a different position according to an embodiment of the disclosure.

FIG. 13 is an enlarged view of a part of the rotating device X of the washing machine 1 shown in FIG. 12. FIG. 14 is an enlarged view illustrating a state in which the coupler 500 of the washing machine 1 shown in FIG. 13 is moved to a different position.

The rotating device X according to an embodiment of the disclosure will be described with reference to FIGS. 13 and 14.

The rotating device X may include the washing shaft 110 and the spin-drying shaft 120.

As mentioned above, the washing shaft 110 may be coupled to the pulsator 40. The spin-drying shaft 120 may be coupled to the drum 30.

The motor assembly 200 may generate a rotational force, and the rotational force generated by the motor assembly 200 may be transmitted to the pulsator 40 and the drum 30 through the washing shaft 110 and the spin-drying shaft 120, respectively.

Hereinafter a process in which the motor assembly 200 transmits power will be described.

First, the coupling of components configured to transmit power of the rotating device X will be described.

The motor assembly 200 may include the fixed stator 220 and the rotating rotor 210.

The rotor 210 may be coupled to the sun gear 610 of the reduction gear module 600. The sun gear 610 may be rotated together with the reduction gear module 600 as the reduction gear module 600 is rotated.

The sun gear 610 may be engaged with the pinion gear 620. Therefore, the pinion gear 620 may be rotatable by the rotation of the sun gear 610.

The pinion gear 620 may be coupled to the carrier 640. As the pinion gear 620 is moved, the carrier 640 may be rotated.

The washing shaft 110 may be coupled to the carrier 640. The washing shaft 110 may be rotated together with the carrier 640 as the carrier 640 is rotated.

The rotor 210 may include the rotor toothed member 211. The rotor toothed member 211 may be a toothed member engaged with the reduction gear module 600.

The rotor toothed member 211 may be positioned on the lower side of the rotor 210.

The third toothed member 540 of the coupler 500 may be engaged with the rotor toothed member 211. As the rotor 210 is rotated, the coupler 500 may be rotated.

The coupler 500 may be engaged with the spin-drying shaft 120. According to the rotation of the coupler 500, the spin-drying shaft 120 may be rotated. The first toothed member 520 of the coupler 500 may be engaged with the washing toothed member 111 of the washing shaft 110.

The coupler 500 may be engaged with the ring gear 630. The coupler 500 may or may not be rotated with the ring gear 630. The second toothed member 530 of the coupler 500 may engaged with the ring toothed member 631 of the ring gear 630.

Hereinafter a power transmission process of the rotating device X will be described.

For convenience of description, it is assumed that the third toothed member 540 of the coupler 500 is engaged with the rotor toothed member 211.

The rotor 210 may be rotated by the current flowing through the stator 220. The rotor 210 may be rotated about the rotation axis of the rotor 210.

When the rotor 210 is rotated, the sun gear 610 may be also rotated. When the sun gear 610 is rotated, the pinion gear 620 may be also rotated. The pinion gear 620 may be rotated and moved. When the pinion gear 620 is moved, the carrier 640 may be rotated about the rotation axis of the sun gear 610. When the carrier 640 is rotated, the washing shaft 110 may be rotated. When the washing shaft 110 is rotated, the pulsator 40 may be rotated.

When the rotor 210 is rotated, the coupler 500 may be rotated together. When the coupler 500 is rotated, the spin-drying shaft 120 connected to the coupler 500 may be rotated together. When the spin-drying shaft 120 is rotated, the drum 30 may also be rotated.

In summary, the rotational force of the rotor 210 may be transmitted to the washing shaft 110 by the reduction gear module 600. The rotational force of the rotor 210 may be transmitted to the spin-drying shaft 120 by the coupler 500.

The rotating device X may include the gear bearing 650. The gear bearing 650 may be configured to allow the sun gear 610 and peripheral components to be rotated independently of each other.

The gear bearing 650 may include a first gear bearing 650 and a second gear bearing 650.

The first gear bearing 650 may support the sun gear 610 and the ring gear 630 to allow the sun gear 610 and the ring gear 630 to be rotated independently of each other.

The second gear bearing 650 may support the sun gear 610 and the carrier 640 to allow the sun gear 610 and the carrier 640 to be rotated independently of each other.

The rotating device X may include the spin-drying shaft 120 connected to the drum 30, and the washing shaft 110 located inside the spin-drying shaft 120 and connected to the pulsator 40.

The spin-drying shaft 120 and the washing shaft 110 may be positioned to penetrate the cover bracket 140.

The cover bracket 140 may be positioned to cover the rotor 210.

The mounting space 210S may be defined inside the rotor 210. The rotor 210 may be provided to surround the mounting space 210S. The mounting space 210S may be located under the cover bracket 140.

The mounting space 210S may be formed inside the motor assembly 200.

The stator 220 may be located in the mounting space 210S. The stator 220 may be positioned below the cover bracket 140.

The support bracket 300 may be positioned below the stator 220.

The coupler moving device 400 may be positioned under the outside of the support bracket 300.

The coupler 500 may be positioned under the inside of the support bracket 300.

The reduction gear module 600 may be positioned in the receiving space 510S of the coupler 500.

The rotor 210 may be positioned below the reduction gear module 600. The reduction gear module 600 may be positioned between the coupler 500 and the rotor 210.

The coupler 500 may be located in the second position when the washing machine 1 performs the washing operation. The coupler 500 may be moved to the second position by the coupler moving device 400.

When the coupler 500 is in the second position, the rotor toothed member 211 of the rotor 210 may be spaced apart from the third toothed member 540 of the coupler 500.

When the coupler 500 is in the second position, the coupler 500 may not be connected to the rotor 210. Because the coupler 500 is not connected to the rotor 210, the rotation of the coupler 500 may be prevented. Therefore, the rotation of the spin-drying shaft 120 connected to the coupler 500 may also be prevented. As the rotation of the spin-drying shaft 120 is prevented, the rotation of the drum 30 may also be prevented.

When the coupler 500 is in the second position, the coupler 500 may be connected to the ring gear 630. The coupler 500 may be connected to the spin-drying shaft 120, and thus the coupler 500 may be indirectly connected to the drum 30. Accordingly, the inertia of the drum 30 may be transmitted to the ring gear 630. The movement of the ring gear 630 may be limited by the inertia of the drum 30.

When the coupler 500 is in the second position, the rotor 210 may be rotated. As the rotor 210 is rotated, the sun gear 610 may be rotated. As the sun gear 610 is rotated, the pinion gear 620 may be rotated and moved. Particularly, the movement of the ring gear 630 may be prevented, and thus the pinion gear 620 may be rotated and moved simultaneously. When the pinion gear 620 is moved, the carrier 640 may be rotated. When the carrier 640 is rotated, the washing shaft 110 may be rotated.

In this case, the rotation speed of the rotor 210 may be reduced through the reduction gear module 600, and then the reduced rotation speed may be transmitted to the washing shaft 110. Accordingly, the rotor 210 may have an optimal rotation speed and the washing shaft 110 may have a rotation speed suitable for washing.

In addition, in the washing operation of the washing machine 1, it is required to generate the water flow by rotating water inside the drum 30, and thus only the pulsator 40 needs to be rotated. As the coupler 500 is spaced apart from the rotor 210, the rotational force of the rotor 210 may not be transmitted to the spin-drying shaft 120, and thus the rotation of the drum 30 may be prevented.

It will be described with an assumption that the rotor 210 and the sun gear 610 are rotated counterclockwise. In a case in which the rotor 210 and the sun gear 610 are rotated clockwise, it will be understood that the rotation direction is reversed in the following description.

The rotor 210 and the sun gear 610 may be rotated counterclockwise.

When the sun gear 610 is rotated counterclockwise, the pinion gear 620 may be rotated clockwise.

The pinion gear 620 may be moved counterclockwise while being rotated clockwise.

As the pinion gear 620 is moved counterclockwise, the carrier 640 and the washing shaft 110 may be rotated counterclockwise.

At this time, the rotation of the coupler 500 may be prevented.

The coupler 500 may be located at the first position when the washing machine 1 performs the spin-drying operation. The coupler 500 may be moved to the first position by the coupler moving device 400.

When the coupler 500 is in the first position, the rotor toothed member 211 of the rotor 210 may be engaged with the third toothed member 540 of the coupler 500.

When the coupler 500 is in the first position, the coupler 500 may be connected to the rotor 210. Because the coupler 500 is connected to the rotor 210, the coupler 500 may be rotated. Accordingly, the spin-drying shaft 120 connected to the coupler 500 may also be rotated. As the spin-drying shaft 120 is rotated, the drum 30 may also be rotated.

When the coupler 500 is in the first position, the coupler 500 may be connected to the ring gear 630. The coupler 500 may be connected to the rotor 210, and thus when the rotor 210 is rotated, the ring gear 630 may be rotated together with the coupler 500.

When the coupler 500 is in the first position, the rotor 210 may be rotated. As the rotor 210 is rotated, the sun gear 610 may be rotated. As the sun gear 610 is rotated, the pinion gear 620 may be moved while the rotation of the pinion gear 620 is prevented. When the pinion gear 620 is moved, the carrier 640 may be rotated. When the carrier 640 is rotated, the washing shaft 110 may be rotated.

Particularly, the ring gear 630 may be rotated at the same angular velocity as the coupler 500. The coupler 500 may be rotated at the same speed as the rotational angular velocity of the rotor 210. This is because the rotor toothed member 211 of the rotor 210 is engaged with the third toothed member 540 of the coupler 500. As the rotor 210 is rotated, the coupler 500 may be rotated, and as the coupler 500 is rotated, the ring gear 630 may be rotated. The ring gear 630 may be rotated at the same angular velocity as the rotor 210.

Because the sun gear 610 is coupled to the rotor 210, the sun gear 610 may be rotated at the same angular velocity as the rotor 210. That is, the rotor 210 may be rotated at the same angular velocity as the sun gear 610 and the ring gear 630.

The pinion gear 620 interposed between the sun gear 610 and the ring gear 630 may be rotated at the same angular velocity as the sun gear 610 and the ring gear 630. Accordingly, the pinion gear 620 may be rotated at the same angular velocity as the sun gear 610 and the ring gear 630 in the circumferential direction around the rotation axis of the sun gear 610.

The carrier 640 connected to the pinion gear 620 may be rotated at the same angular velocity as the moving speed of the pinion gear 620. The washing shaft 110 connected to the carrier 640 may be rotated at the same angular velocity as the rotor 210. The pulsator 40 connected to the washing shaft 110 may be rotated at the same angular velocity as the rotor 210.

Because the rotor 210 and the coupler 500 are connected, the coupler 500 may be rotated at the same angular velocity as the rotor 210. The coupler 500 may be rotated at the same angular velocity as the spin-drying shaft 120. Because the drum 30 is connected to the spin-drying shaft 120, the drum 30 may be rotated at the same angular velocity as the spin-drying shaft 120. That is, the drum 30 may be rotated at the same angular velocity as the rotor 210.

In summary, when the washing machine 1 performs the spin-drying operation, the rotor 210, the pulsator 40, and the drum 30 may be rotated at the same angular velocity.

It will be described with an assumption that the rotor 210 and the sun gear 610 are rotated counterclockwise. In a case in which the rotor 210 and the sun gear 610 are rotated clockwise, it will be understood that the rotation direction is reversed in the following description.

The rotor 210 and the sun gear 610 may be rotated counterclockwise.

The coupler 500 connected to the rotor 210 may be rotated counterclockwise.

The ring gear 630 connected to the coupler 500 may be rotated counterclockwise.

When the sun gear 610 is rotated counterclockwise, the pinion gear 620 may be rotated counterclockwise. This is because the sun gear 610 and the ring gear 630 have the same angular velocity, but a speed at a contact point between the ring gear 630 and the pinion gear 620 is greater than a speed at a contact point between the sun gear 610 and the pinion gear 620.

The pinion gear 620 may be rotated around the rotation axis of the sun gear 610 together with the sun gear 610 and the ring gear 630. The moving angular velocity of the pinion gear 620 is equal to the angular velocity of the ring gear 630 and the sun gear 610. The pinion gear 620 may be moved counterclockwise around the rotation axis of the sun gear 610.

The carrier 640 and the washing shaft 110 connected to the pinion gear 620 may also be rotated counterclockwise. The pulsator 40 connected to the washing shaft 110 may be rotated counterclockwise.

The spin-drying shaft 120 connected to the coupler 500 may be rotated counterclockwise. The drum 30 connected to the spin-drying shaft 120 may be rotated counterclockwise.

That is, the drum 30 and the pulsator 40 may be rotated in the same direction.

In other words, while the washing machine 1 performs the spin-drying operation, the coupler 500 may be rotated at the same speed as the rotor 210 as the rotor 210 is rotated, and the ring gear 630 may be rotated together with the coupler 500 as the coupler 500 is rotated, and the spin-drying shaft 120 and the washing shaft 110 may be rotated at the same speed as the ring gear 630 and the carrier 640 as the ring gear 630 and the carrier 640 are rotated.

As mentioned above, the coupler 500 may be movable to the first position or the second position.

The first element 410 may be positioned in the gap space 223S defined on the upper side of the coupler 500.

The first element 410 may be positioned adjacent to the spin-drying shaft 120.

The second element 420 may be located in the receiving space 510S defined below the coupler 500.

The second element 420 may be positioned between the coupler 500 and the carrier 640.

The second element 420 may be located inside the rotor 210. The second element 420 may interact with the first element 410 to move the coupler 500 from the second position to the first position.

When the coupler 500 is moved from the second position to the first position, the second element 420 may be spaced apart from the first element 410 with respect to a direction in which the coupler 500 is moved.

The first element 410 may move the second element 420 to allow the second element 420 to be close to or away from the first element 410. The coupler 500 may be movable together with the second element 420 as the second element 420 is moved. The coupler 500 may be moved to be positioned close to the first element 410 or positioned away from the first element 410 by the movement of the second element 420.

The second element 420 may be configured to be away from the first element 410 when current flows through the first element 410. However, the disclosure is not limited thereto, and the second element 420 may be configured to be close to the first element 410 when current flows through the first element 410. Hereinafter, for convenience of description, it is assumed that the second element 420 moves away from the first element 410 when current flows through the first element 410. In the opposite case, it should be understood that the positional relationship is in reverse.

The coupler moving device 400 may include an elastic member 430. When stress due to compression or tensile stress is applied to the elastic member 430, the elastic member 430 may generate an elastic force by being deformed in a direction opposite to the stress.

The elastic member 430 may be provided to allow the coupler 500 to pressed toward the first element 410. The elastic member 430 may be provided to be moved upward.

The coupler 500 may be moved toward the first element 410 when current does not flow through the first element 410. This is because the coupler 500 is pressed toward the first element 410. The coupler 500 may be moved upward when current does not flow through the first element 410.

The coupler 500 may be moved to be positioned at the first position when current does not flow through the first element 410. When the coupler 500 is in the first position, the coupler 500 may be positioned closer to the first element 410 than when the coupler 500 is in the second position. When the coupler 500 is in the first position, the coupler 500 may be positioned higher than when the coupler 500 is in the second position.

The first element 410 may have a shape, in which a horizontal length is greater than a vertical length, in a cross section cut in a plane including the up and down direction.

The elastic member 430 may be located in the receiving space 510S defined by the coupler 500. Accordingly, even when the elastic member 430 is included in the rotating device X, it is possible to prevent an increase in the volume due to the elastic member 430.

The elastic member 430 may be located below the coupler 500. Accordingly, the elastic member 430 may press the coupler 500 upward.

The elastic member 430 may be positioned above the carrier 640. The elastic member 430 may be positioned between the coupler 500 and the carrier 640.

The elastic member 430 may be positioned to surround the spin-drying shaft 120. The elastic member 430 may be positioned adjacent to the spin-drying shaft 120. The elastic member 430 may be positioned closer to the spin-drying shaft than the second element 420.

The elastic member 430 may include a spring.

The coupler 500 may be moved by the movement of the second element 420 when current flows through the first element 410. The coupler 500 may be moved from the first position to the second position when current flows through the first element 410. The coupler 500 may be moved toward a direction away from the first element 410 when current flows through the first element 410.

The elastic member 430 may be compressed while the coupler 500 is moved from the first position to the second position. Accordingly, the elastic member 430 may apply an elastic force in a tensioned direction while the coupler 500 is moved from the first position to the second position. The elastic member 430 may apply an elastic force to the coupler 500 while the coupler 500 is moved from the first position to the second position. The elastic member 430 may apply an elastic force to the coupler 500 to allow the coupler 500 to be pressed toward the first element 410 while the coupler 500 is moved from the first position to the second position. The elastic member 430 may apply an elastic force to the coupler 500 to allow the coupler 500 to be pressed upward while the coupler 500 is moved from the first position to the second position.

When current does not flow through the first element 410, the coupler 500 may be moved from the second position to the first position by being pressed by the elastic member 430.

Figure 15:
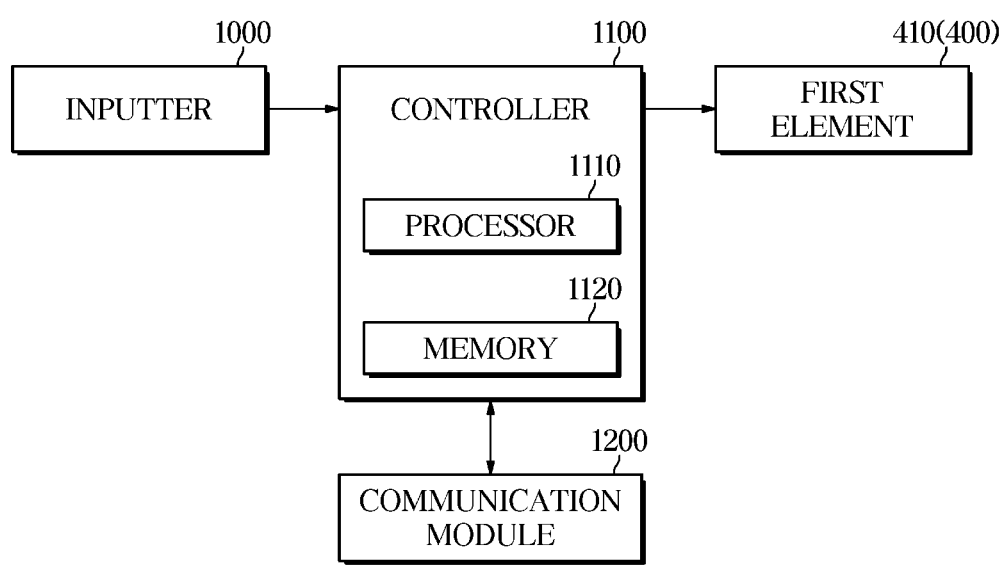
FIG. 15 is a control block diagram related to movement of the coupler of the washing machine shown in FIG. 14 according to an embodiment of the disclosure.

FIG. 15 is a control block diagram related to movement of the coupler 500 of the washing machine 1 shown in FIG. 14.

A method of controlling movement of the coupler 500 according to an embodiment of the disclosure will be described with reference to FIG. 15.

The washing machine 1 may include an inputter 1000. The inputter 1000 may be a component configured to receive a user's input.

The inputter 1000 may include the control panel 13.

The washing machine 1 may include a controller 1100. The controller 1100 may be a component configured to control a component to be controlled.

The controller 1100 may include a processor 1110 and a memory 1120.

The processor 1110 may include a program (a plurality of instructions) for processing signals and providing control signals.

The memory 1120 may include a volatile memory 1120 such as Static Random Access Memory (S-RAM) and Dynamic Random Access Memory (D-RAM), and a non-volatile memory 1120 such as Read Only Memory (ROM), and Erasable Programmable Read Only Memory (EPROM).

The memory 1120 may be provided integrally with the processor 1110 or may be provided as a semiconductor device separated from the processor 1110.

The processor 1110 may further include a processing core (e.g., a memory circuit and a control circuit) that processes signals based on programs or data stored in the memory 1120 and outputs control signals.

The washing machine 1 may include a communication module 1200. The communication module 1200 may be a component for communicating with an external device.

The communication device may include a wireless communication module 1200 for wireless communication with an external device or a wired communication module 1200 for wired communication with an external device.

The wireless communication module 1200 may transmit and receive communication signals to and from an access point (AP) or a base station wirelessly. The AP or base station may be connected to a wide area network (e.g., intranet or Internet). The wireless communication module 1200 may transmit and receive communication signals to and from a server device of a wide area communication network via an AP or a base station.

The wired communication module 1200 may be connected to a wide area communication network (e.g., intranet or Internet) through a hub, router, switch or gateway. The wired communication module 1200 may also transmit and receive communication signals with a server device of a wide area communication network.

The processor 1110 may obtain a user's signal through the inputter 1000. The processor 1110 may control the first element 410 based on a signal input by a user.

Particularly, when a user inputs a signal corresponding to the washing operation of the washing machine 1 to the inputter 1000, the processor 1110 may prevent current from flowing in the first element 410 based on the signal generated by the inputter 1000. In this case, because the coupler 500 is positioned at the first position, the rotation of the drum 30 may be prevented, and the pulsator 40 may be rotatable.

When a user inputs a signal corresponding to the spin-drying operation of the washing machine 1 to the inputter 1000, the processor 1110 may allow current to flow in the first element 410 based on the signal generated by the inputter 1000. In this case, because the coupler 500 is positioned at the second position, the drum 30 may be rotated together with the pulsator 40.

In the above, the washing machine 1 according to an embodiment of the disclosure has been described. Hereinafter a washing machine 1 according to another embodiment will be described. In describing other embodiments, the same reference numerals are given to the same components as those shown in FIGS. 1 to 15, and a description thereof may be omitted.

Figure 16:
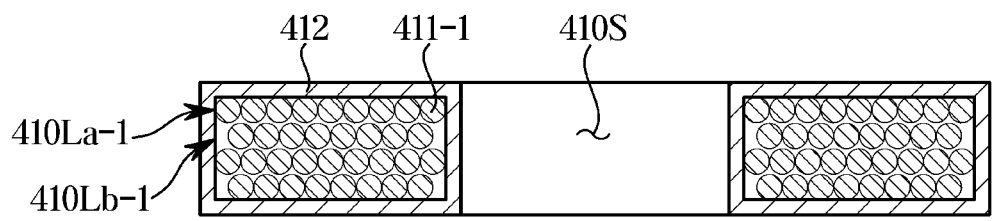
FIG. 16 is a cross-sectional view of a first element of a washing machine according to an embodiment of the disclosure.

FIG. 16 is a cross-sectional view of a first element 410-1 of a washing machine 1-1 according to an embodiment of the disclosure.

The first element 410-1 according to another embodiment of the disclosure will be described with reference to FIG. 16.

A coupler moving device 400-1 may include the first element 410-1.

The first element 410-1 may include a coil housing 412 and a coil 411-1.

As shown in FIG. 16, based on a cross section cut through the first element 410-1, a cross section of the plurality of coils 411-1 may define a first row 410La-1 and a second row 410Lb-1.

The second row 410Lb-1 may be a cross section row of the coil 411-1 adjacent to the first row 410La-1.

Each of the cross sections of the plurality of coils 411-1 forming the second row 410Lb-1 may be arranged between the cross sections of the plurality of coils 411-1 forming the first row 410La-1. Accordingly, the coil 411-1 may be further integrated and disposed in the coil housing 412.

This embodiment is different from the embodiment described with reference to FIGS. 1 to 15 in that the winding arrangement of the coil 411-1 is different.

Figure 17:
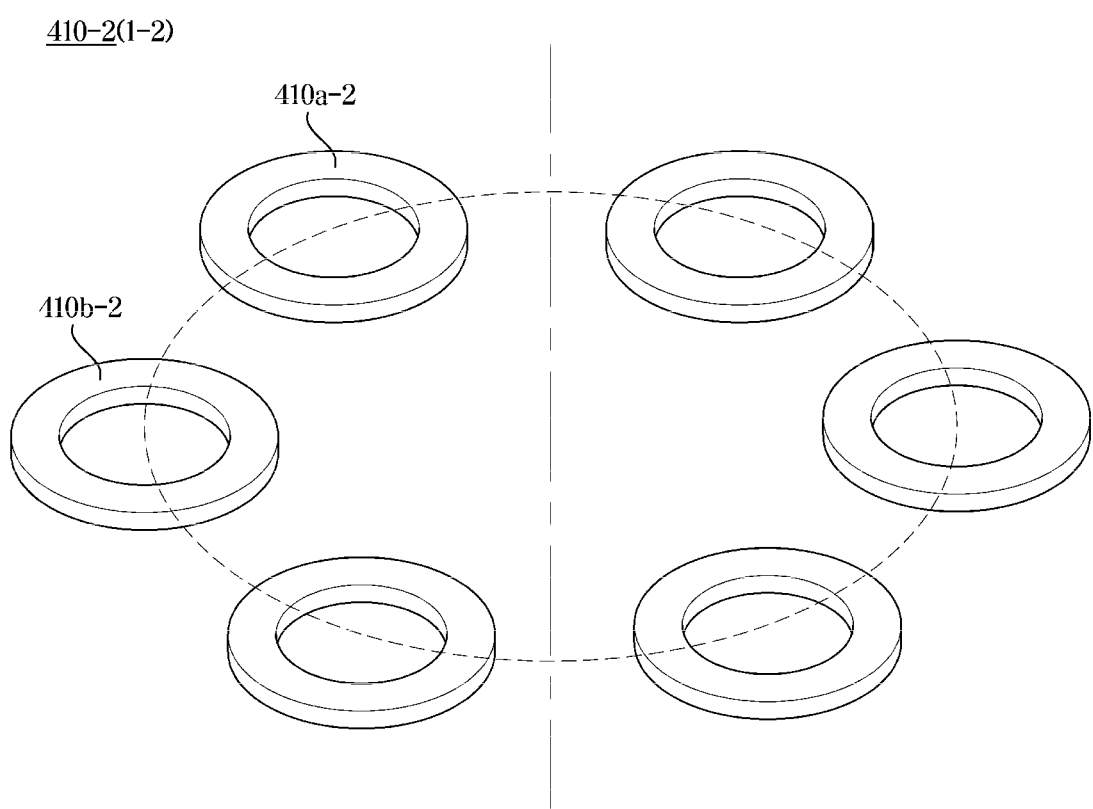
FIG. 17 is a perspective view of a first element of a washing machine according to an embodiment of the disclosure.

FIG. 17 is a perspective view of a first element 410-2 of a washing machine 1-2 according to an embodiment of the disclosure.

The first element 410-2 according to another embodiment of the disclosure will be described with reference to FIG. 17.

A coupler moving device 400-2 may include the first element 410-2.

The first element 410-2 may include a part element. The part element may be provided in plurality.

The part element may include a first part element 410a-2 and a second part element 410b-2. The second part element 410b-2 may be positioned adjacent to the first part element 410a-2.

The plurality of part elements may be positioned so as to be arranged in a circumferential direction of a circle. Each of the plurality of part elements may be positioned to be spaced apart at equal intervals.

The plurality of part elements may be arranged rotationally symmetrical around the washing shaft 110 or the spin-drying shaft 120.

The first part element 410*a*-2 and the second part element 410*b*-2 may include a coil 411-2 and a coil housing 412-2, respectively.

This embodiment is different from the embodiment described with reference to FIGS. 1 to 15 in that a plurality of coils 411-2 is included.

The plurality of coils 411-2 may be arranged in a circumferential direction with respect to the spin-drying shaft 120 to allow a magnetic field to be formed at a position in which the plurality of coils 411-2 is arranged.

In the embodiment that is described with reference to FIGS. 1 to 15, the coil 411 has one winding shape. The coil 411 of the shape is characterized in that the strongest magnetic field is formed at the point where the central axis of winding is located.

However, the spin-drying shaft 120 or the washing shaft 110 may be located at a position corresponding to the central axis of the coil 411. Accordingly, it is difficult for the second element 420 to be positioned at a point in which the strongest magnetic field formed by the coil 411 is formed.

However, in this embodiment, the plurality of coils 411-2 may be formed, and each coil 411-2 may be wound around a different central axis. The central axis of each of the plurality of coils 411-2 may be positioned to be spaced apart from a position of the spin-drying shaft 120 or the washing shaft 110. In this case, the second element 420 may be located at a position corresponding to the central axis of each of the plurality of coils 411-2.

Each coil 411-2 may form a strong magnetic field at a position corresponding to each central axis defined by each coil 411-2.

The results of this experiment are as follows.

Figure 18:
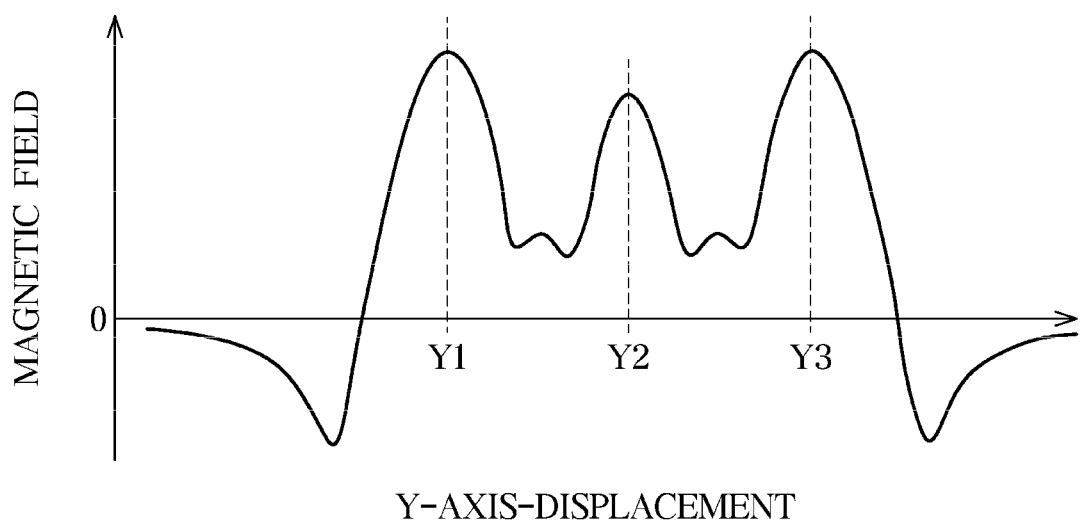
FIG. 18 is a graph illustrating a magnetic field distribution according to a position of the first element of the washing machine shown in FIG. 17.

FIG. 18 is a graph illustrating a magnetic field distribution according to a position of the first element 410-2 of the washing machine 1-2 shown in FIG. 17.

The position of the first element 410-2 according to an embodiment of the disclosure and magnetic fields according to the position will be described with reference to FIG. 18.

An X-axis represents a position on the first element 410-2. A Y-axis represents a magnitude of the magnetic field at each position.

Y1 and Y3 are positions corresponding to the central axis of the coil 411-2. Y2 is a position corresponding to the central axis in which the plurality of coils 411-2 is arranged.

A magnitude of the magnetic field is strong when the first element 410-2 is Y1, Y2, and Y3, respectively. That is, the magnitude of the magnetic field may be strong at the central axis of each of the plurality of coils 411-2 and the central axis in which the plurality of coils 411-2 is arranged.

Additionally, when the first element 410-2 includes the plurality of coils 411-2, various movements of the coupler 500 may be implemented by controlling each coil 411-2.

For example, when current alternately flows through the even-numbered coils 411-2 and the odd-numbered coils 411-2 of the plurality of coils 411-2, the coupler 500 may be rotated and moved. A related embodiment will be described later with reference to related drawings.

Additionally, because the embodiment includes the plurality of coils 411-2, the rising height of the coupler 500 may be adjusted by controlling the number of the coils 411-2, through which current flows, among the plurality of coils 411-2.

Additionally, because the rising height of the coupler 500 is adjusted according to the embodiment, it is possible to obtain an additional effect. A related embodiment will be described later with reference to related drawings.

Figure 19:
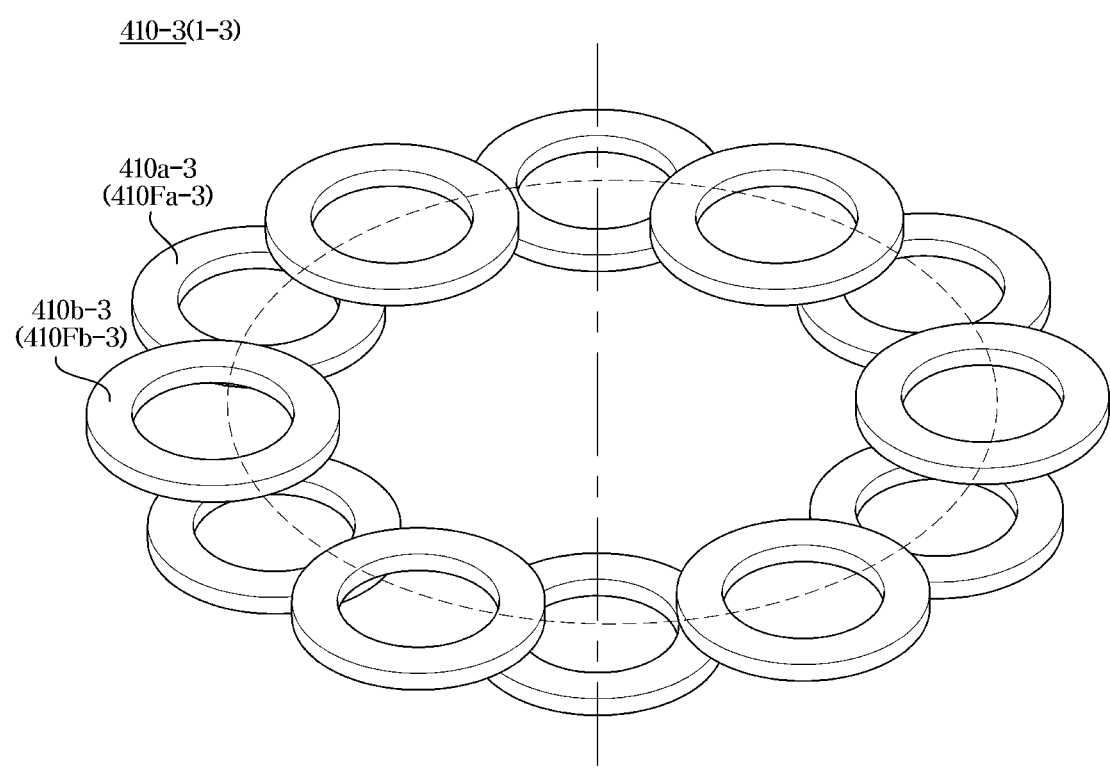
FIG. 19 is a perspective view illustrating a first element of a washing machine according to an embodiment of the disclosure.

FIG. 19 is a perspective view illustrating a first element 410-3 of a washing machine 1-3 according to an embodiment of the disclosure.

The first element 410-3 according to another embodiment of the disclosure will be described with reference to FIG. 19.

The first element 410-3 may include a plurality of layers including a plurality of coils 411-3 arranged along a central axis.

The plurality of layers may include a first coil layer 410Fa-3 and a second coil layer 410Fb-3.

It is different from the embodiment described with reference to FIGS. 17 to 18 in that a plurality of layers having different heights is provided.

Accordingly, the coil 411-3 may be more efficiently disposed within the same space.

The coil 411-3 included in the first coil layer 410Fa-3 and the coil 411-3 included in the second coil layer 410Fb-3 may be arranged to overlap and cross each other.

The first coil layer 410Fa-3 may be spaced apart from the coupler 500 by a first distance.

The second coil layer 410Fb-3 may be positioned to be separated from the coupler 500 by a second distance greater than the first distance so as to be independently controlled from the first coil layer 410Fa-3.

According to the embodiment, a rotational movement of the coupler 500 may be induced as current alternately flows through the first coil layer 410Fa-3 and the second coil layer 410Fb-3.

Additionally, because the rising height of the coupler 500 is adjusted according to the embodiment, it is possible to obtain an additional effect. Particularly, because the plurality of coils 411-3 is provided in the first coil layer 410Fa-3 and the second coil layer 410Fb-3 according to the embodiment, it is possible to include more coils 411-3 than the embodiment shown in FIG. 18. Accordingly, it is possible to more finely adjust the height of the coupler 500.

Figure 20:
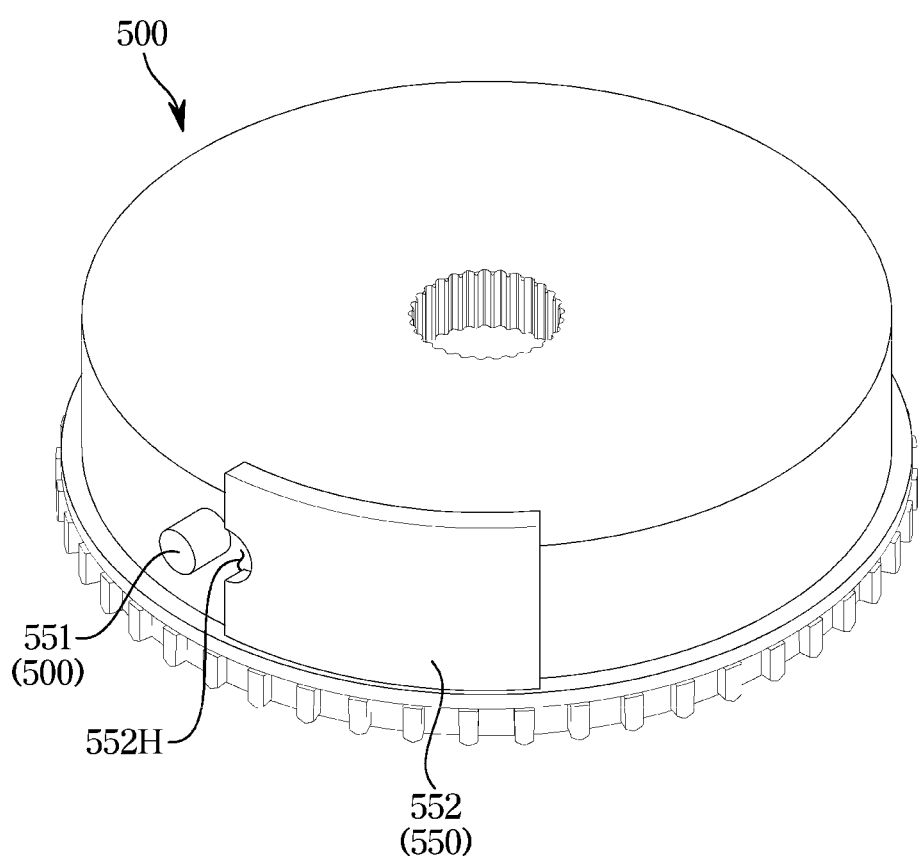
FIG. 20 is a perspective view illustrating a locking device configured to lock the coupler of the washing machine according to an embodiment of the disclosure and a configuration related thereto.

FIG. 20 is a perspective view illustrating a locking device 550 configured to lock the coupler 500 of the washing machine 1 according to an embodiment of the disclosure and a configuration related thereto.

The locking device 550 according to another embodiment of the disclosure will be described with reference to FIG. 20.

In the above-described embodiment, the coupler 500 may be rotatably movable.

When the coupler 500 is rotatably movable, the coupler 500 may be moved to prevent the coupler 500 from moving as will be described later. When the coupler 500 is located at a desired position in a state in which the movement of the coupler 500 is prevented, it is possible to maintain the position of the coupler 500 for the desired operation, without separate power loss.

The rotating device X may include the locking device 550. The locking device 550 may be configured to prevent the movement of the coupler 500.

The locking device 550 may include a locking protrusion 551.

The locking protrusion 551 may extend from the coupler 500. The locking protrusion 551 may protrude from the coupler 500. The locking protrusion 551 may protrude from the outside of the coupler 500.

The locking protrusion 551 may extend outward in the radial direction of the coupler 500.

The locking protrusion 551 may be integrally formed with the coupler 500.

The locking device 550 may include a locking unit 552. The locking unit 552 may be configured to prevent the movement of the coupler 500 when the coupler 500 is rotated.

The locking unit 552 may interact with the locking protrusion 551 to prevent the movement of the coupler 500.

A locking groove 552H may be defined by the locking unit 552. The locking protrusion 551 may be provided to be received in the locking groove 552H.

When the locking protrusion 551 is received in the locking groove 552H, the movement of the coupler in one direction may be prevented.

The locking groove 552H may be defined to be concave in the locking protrusion 551 along the direction of rotation of the coupler 500.

Figure 21:
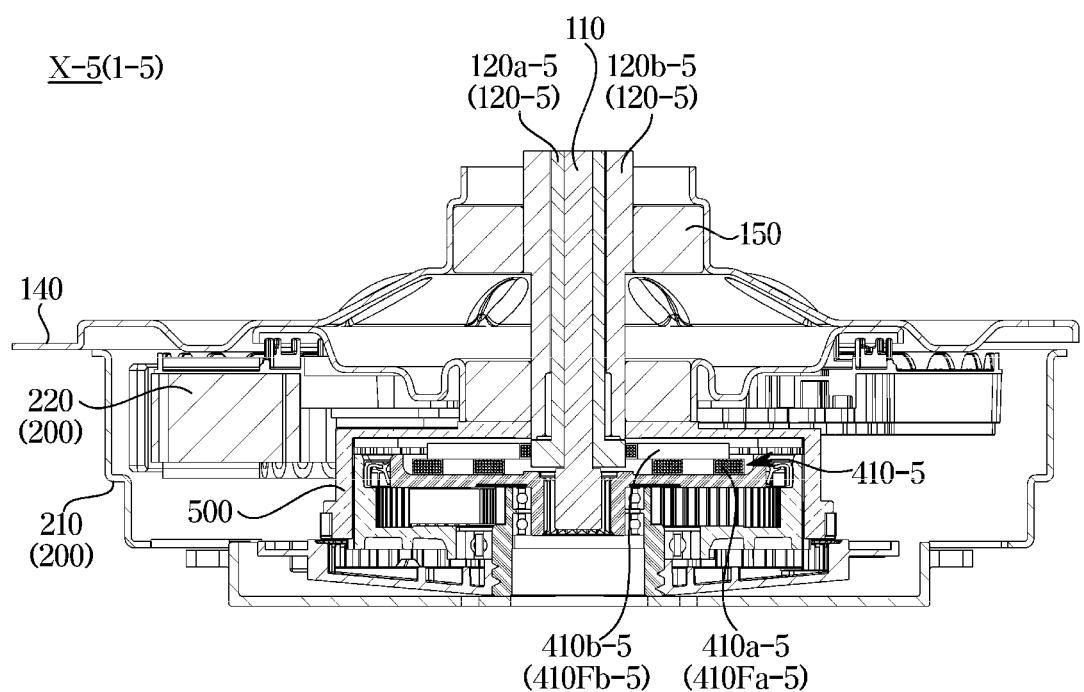
FIG. 21 is a cross-sectional view illustrating a rotating device of a washing machine according to an embodiment of the disclosure.

FIG. 21 is a cross-sectional view illustrating a rotating device X-5 of a washing machine 1-5 according to an embodiment of the disclosure.

A spin-drying shaft 120-5 and a washing shaft 110-5 according to another embodiment of the disclosure will be described with reference to FIG. 21.

In the above-described embodiment, the rising height of the coupler 500 may be adjusted.

The coupler 500 may be coupled to a plurality of shafts as the rising height of the coupler 500 is controlled.

The rotating device X-5 may include a first shaft 120a-5, a second shaft 120b-5, and the washing shaft 110-5.

The washing shaft 110-5 may be received in the first shaft 120a-5.

The first shaft 120a-5 may be received in the second shaft 120b-5.

The first shaft 120a-5 may include a shape protruding outward from the second shaft 120b-5.

The second shaft 120b-5 may be coupled to an auxiliary pulsator (not shown). Accordingly, when the second shaft 120b-5 is rotated, the auxiliary pulsator (not shown) may be rotated.

The first shaft 120a-5 may be coupled to the drum 30. Accordingly, when the second shaft 120b-5 is rotated, the drum 30 may be rotated.

As the height of the coupler 500 is adjusted, the coupler 500 may be engaged with the first shaft 120a-5 or the second shaft 120b-5.

The washing shaft 110-5 may be rotated when the rotor 210 is rotated.

The coupler 500 may be positioned to be engaged with the second shaft 120b-5 without being engaged with the rotor 210. In this case, the auxiliary pulsator may be rotated together with the pulsator 40. Accordingly, it is possible to additionally perform a washing operation for strong washing.

The coupler 500 may be engaged with the rotor 210, and engaged with the first shaft 120a-5 without being engaged with the second shaft 120b-5.

A height, at which a component of the second shaft 120b-5 provided to be engaged with the coupler 500 is positioned, may be higher than a height, at which a component of the first shaft 120a-5 provided to be engaged with the coupler 500 is positioned.

Accordingly, while the coupler 500 is moved downward, the coupler 500 may be disengaged from the second shaft 120b-5 and engaged with the first shaft 120a-5.

However, the engagement relationship between the coupler 500 and the first shaft 120a-5 and the second shaft 120b-5 described above is only an example. The coupler 500 may be positioned at a position in which the coupler 500 is engaged with the first shaft 120a-5 without being engaged with the rotor 210.

Figure 22:
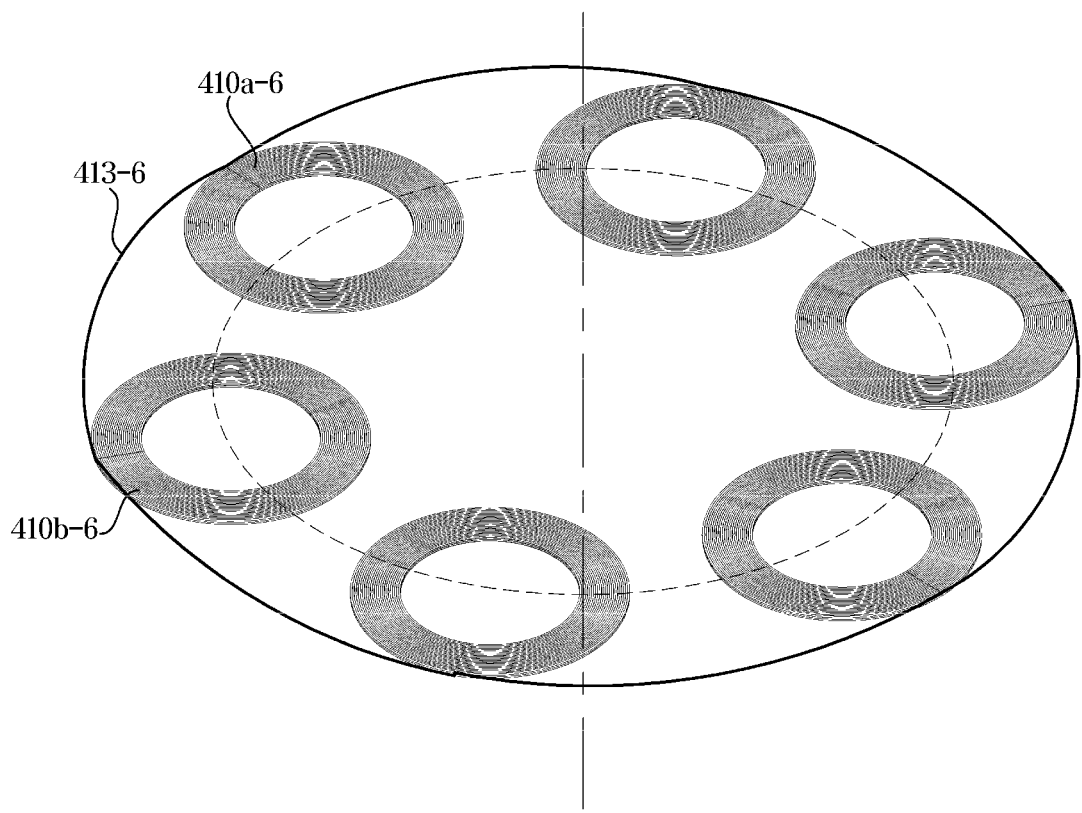
FIG. 22 is a perspective view illustrating a first element of a washing machine according to an embodiment of the disclosure.

FIG. 22 is a perspective view illustrating a first element 410-6 of a washing machine 1-6 according to an embodiment of the disclosure.

The first element 410-6 according to another embodiment of the disclosure will be described with reference to FIG. 22.

A coupler moving device 400-6 may include the first element 410-6.

The first element 410-6 may include a plurality of coils. The plurality of coils may be wound about each central axis.

The plurality of coils may have a circular shape.

The plurality of coils may include a first coil 410a-6 and a second coil 410b-6.

The first element 410-6 may include a connection line 413-6. The connection line 413-6 may be configured to connect the first coil 410a-6 and the second coil 410b-6.

The connection line 413-6 may be positioned to be in contact with an outer circumference of a circle of the first coil 410a-6 and an outer circumference of a circle of the second coil 410b-6.

Each of the plurality of coils may be electrically connected by the connection lines 413-6. In this case, it may be difficult to flow different current to each of the plurality of coils 411-6. However, because current simultaneously flows through the first element 410-6, control may be facilitated.

Figure 23:
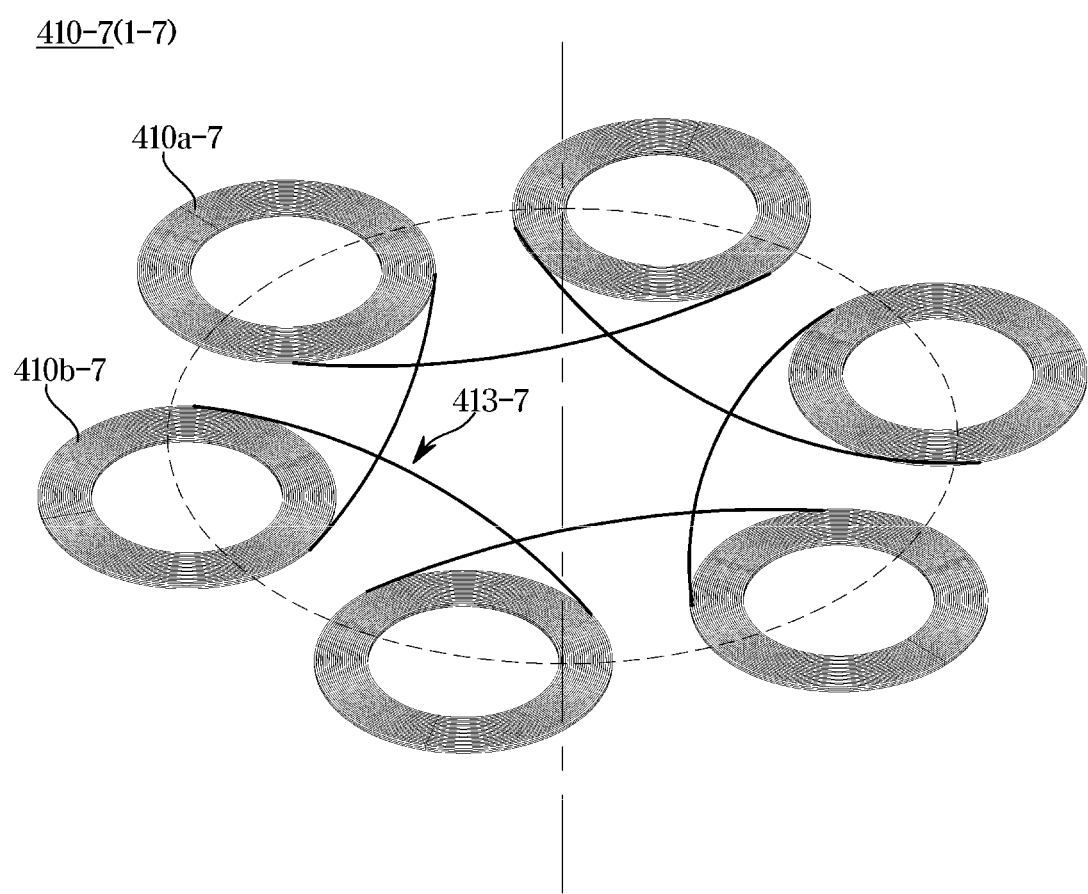
FIG. 23 is a perspective view illustrating a first element of a washing machine according to an embodiment of the disclosure.

FIG. 23 is a perspective view illustrating a first element 410-7 of a washing machine 1-7 according to an embodiment of the disclosure.

The first element 410-7 according to another embodiment of the disclosure will be described with reference to FIG. 23.

A coupler moving device 400 may include the first element 410-7.

The first element 410-7 may include a plurality of coils. The plurality of coils may be wound about each central axis.

The plurality of coils may have a circular shape.

The plurality of coils may include a first coil 410a-7 and a second coil 410b-7.

The first element 410-7 may include a connection line 413-7. The connection line 413-7 may be configured to connect the first coil 410a-7 and the second coil 410b-7.

The connection line 413-7 may be positioned to be in contact with an inner circumference of a circle of the first coil 410a-7 and an inner circumference of a circle of the second coil 410b-7.

Each of the plurality of coils may be electrically connected by the connection lines 413-7. In this case, it may be difficult to flow different current to each of the plurality of coils. However, because current simultaneously flows through the first element 410-7, control may be facilitated.

Figure 24:
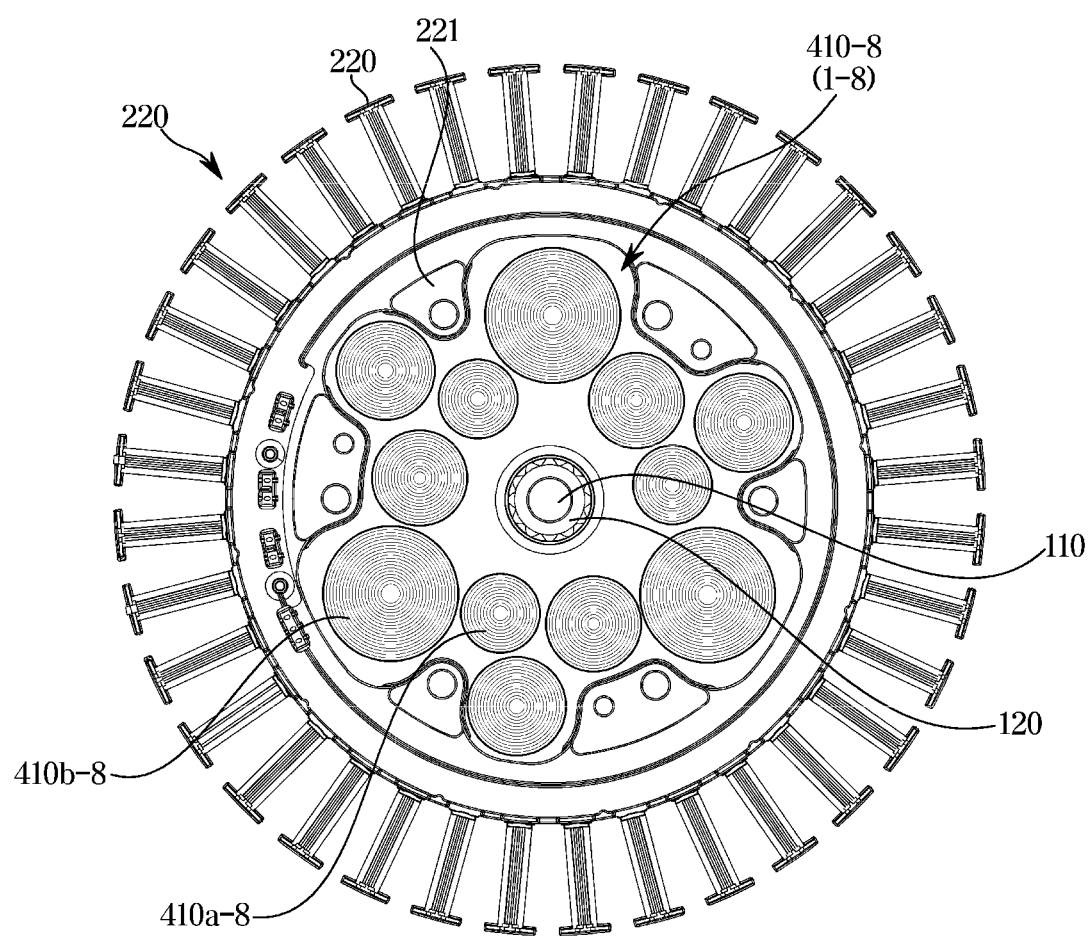
FIG. 24 is a plan view illustrating a first element of a washing machine according to an embodiment of the disclosure and a configuration related thereto.

FIG. 24 is a perspective view illustrating a first element 410-8 of a washing machine 1-8 according to an embodiment of the disclosure.

The first element 410-8 according to another embodiment of the disclosure will be described with reference to FIG. 24.

A rotating device X-8 may include the stator 220.

The stator space 220S may be defined by the core member 221 of the stator 220.

The stator space 220S may include a central space 220Sa and a branch space 220Sb extending radially from the central space 220Sa.

A coupler moving device Y-8 may include the first element 410-8.

The first element 410-8 may include a first part element 410a-8 received in the central space 220Sa. The first part element 410a-8 may be provided in plurality.

The spin-drying shaft 120 may pass through the central space 220Sa.

The branch space 220Sb may communicate with the central space 220Sa and may be disposed in a circumferential direction with respect to the spin-drying shaft 120.

The first element 410-8 may include a second part element 410b-8 received in the branch space 220Sb. The second part element 410b-8 may be provided in plurality.

Figure 25:
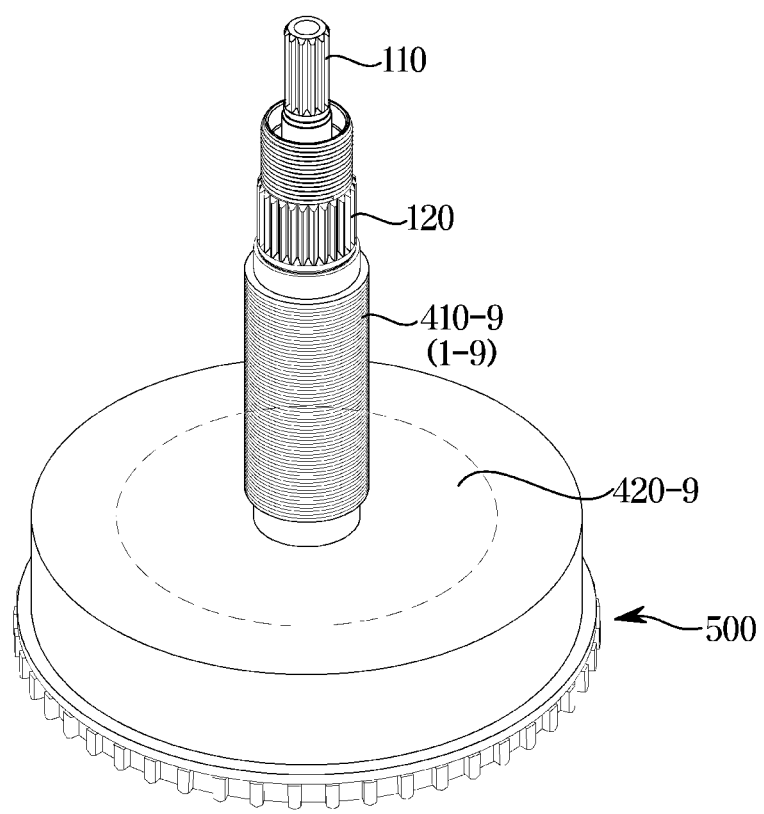
FIG. 25 is a perspective view illustrating a first element of a washing machine according to an embodiment of the disclosure and a configuration related thereto.

FIG. 25 is a perspective view illustrating a first element 410-9 of a washing machine 1-9 according to an embodiment of the disclosure.

The first element 410-9 according to another embodiment of the disclosure will be described with reference to FIG. 25.

A coupler moving device Y-9 may include the first element 410-9. The first element 410-9 may include a coil 411-9.

The coil 411-9 may be wound around the spin-drying shaft 120 on the outside of the spin-drying shaft 120. Accordingly, the coil 411-9 may be configured to occupy less space.

The first element 410-9 may include the coil 411-9 configured to be wound around the spin-drying shaft 120 to form a magnetic field at a position corresponding to the spin-drying shaft 120.

Figure 26:
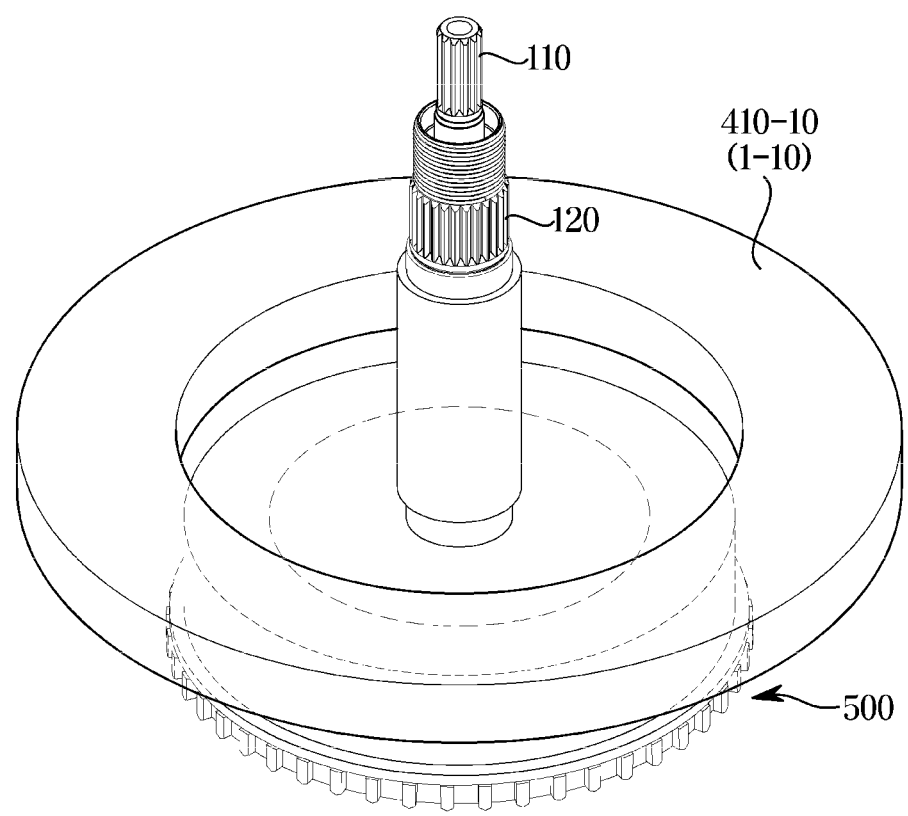
FIG. 26 is a perspective view illustrating a first element of a washing machine according to an embodiment of the disclosure and a configuration related thereto.

FIG. 26 is a perspective view illustrating a first element 410-10 of a washing machine 1-10 according to an embodiment of the disclosure.

The first element 410-10 according to another embodiment of the disclosure will be described with reference to FIG. 26.

A coupler moving device 400-10 may include the first element 410-10.

The first element 410-10 may be positioned to be spaced apart from each other in a radial direction with respect to the spin-drying shaft 120. The first element 410-10 may be located outside the coupler 500. A distance from the spin-drying shaft 120 to the first element 410-10 may be greater than a distance from the outer surface of the coupler 500 to the spin-drying shaft 120.

The first element 410-10 may extend in a circumferential direction with respect to the spin-drying shaft 120.

Figure 27:
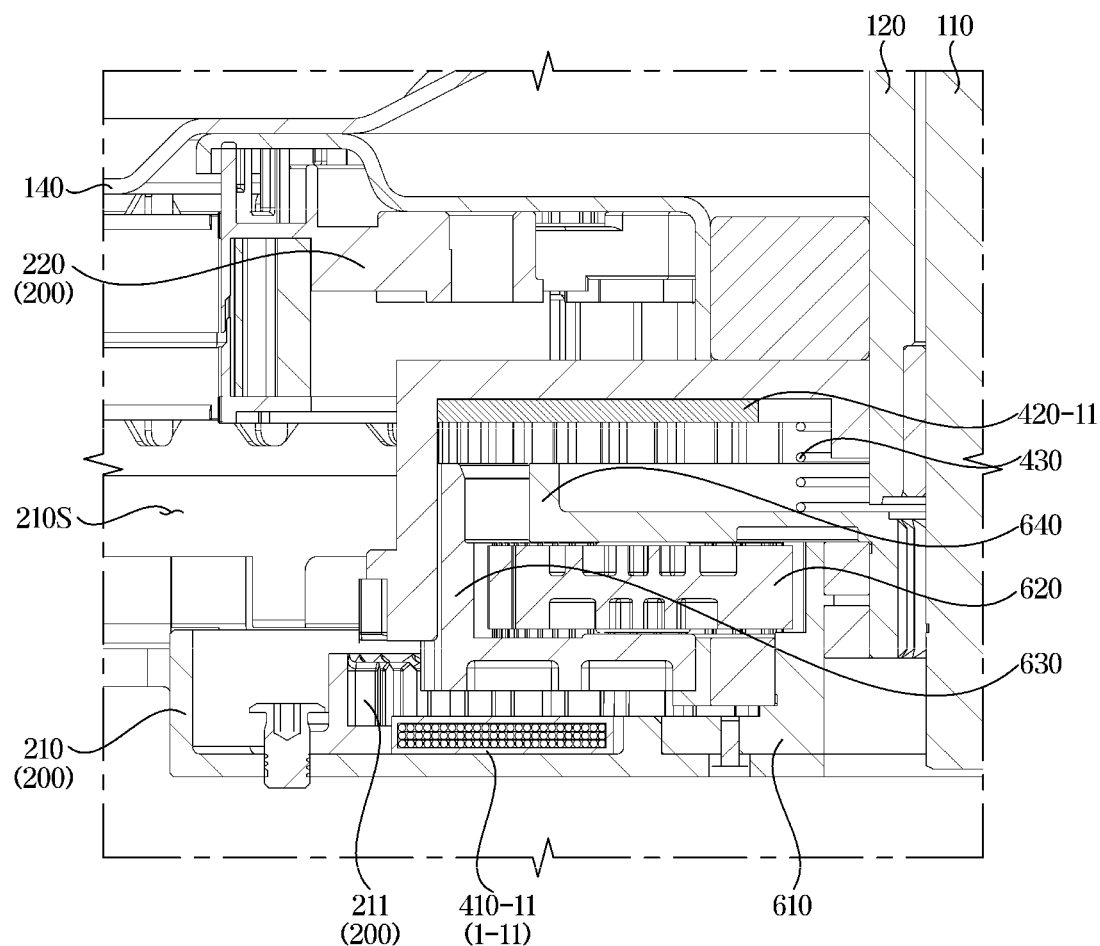
FIG. 27 is a cross-sectional view illustrating a coupler moving device according to an embodiment of the disclosure and a configuration related thereto.

FIG. 27 is a cross-sectional view illustrating a coupler moving device 400-11 according to an embodiment of the disclosure and a configuration related thereto.

The coupler moving device 400-11 according to another embodiment of the disclosure will be described with reference to FIG. 27.

The coupler moving device 400-11 may include a first element 410-11.

The first element 410-11 may be located on the lower side of the coupler 500. The first element 410-11 may be positioned to face a second element 420-11.

Figure 28:
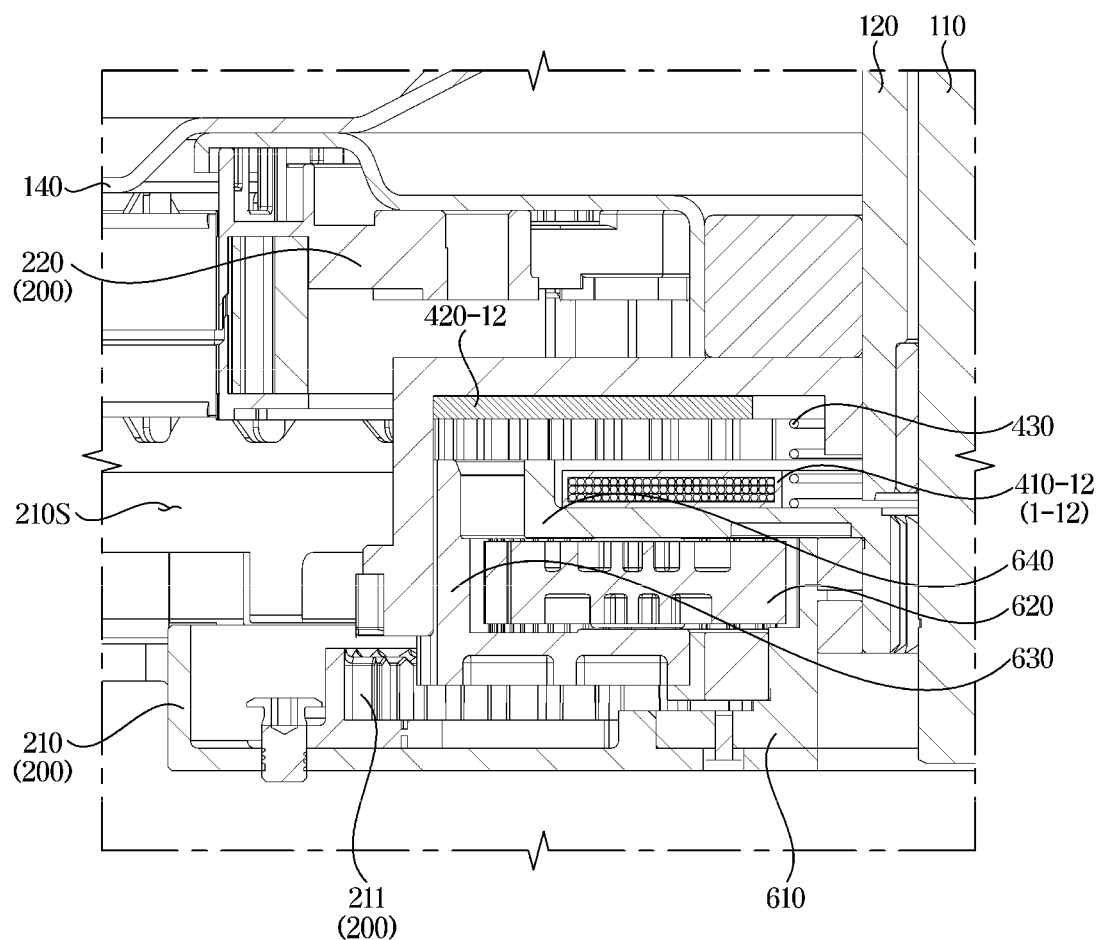
FIG. 28 is a cross-sectional view illustrating a coupler moving device according to an embodiment of the disclosure and a configuration related thereto.

FIG. 28 is a cross-sectional view illustrating a coupler moving device 400-12 according to an embodiment of the disclosure and a configuration related thereto.

The coupler moving device 400-12 according to another embodiment of the disclosure will be described with reference to FIG. 28.

A first element 410-12 may be received in a receiving space 510S defined by the coupler 500.

The first element 410-12 may be received inside the carrier 640.

The first element 410-12 may be positioned to face a second element 420-12.

Figure 29:
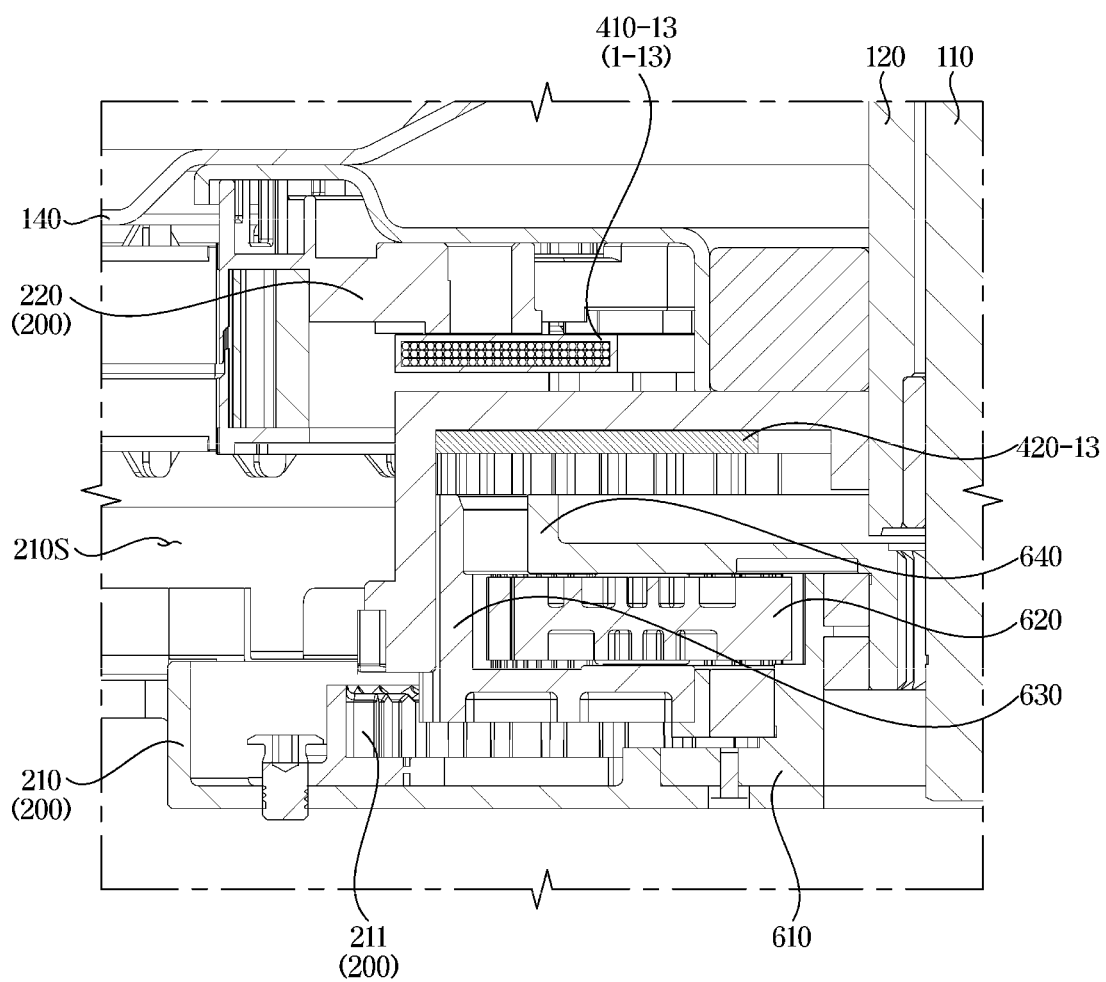
FIG. 29 is a cross-sectional view illustrating a coupler moving device according to an embodiment of the disclosure and a configuration related thereto.

FIG. 29 is a cross-sectional view illustrating a coupler moving device 400-13 according to an embodiment of the disclosure and a configuration related thereto.

The coupler moving device 400-13 according to another embodiment of the disclosure will be described with reference to FIG. 29.

The coupler moving device 400-13 may not include the elastic member.

In this case, the coupler 500 may be moved from the first position to the second position by its own weight.

A second element 420-13 may be moved toward a first element 410-13 when current flows through the first element 410-13. The coupler 500 may be moved toward the first element 410-13 by the movement of the second element 420-13 when current flows through the first element 410-13. The coupler 500-13 may be moved toward the first position when current flows through the first element 410-13.

When the coupler 500 is moved from the first position to the second position, current may be blocked in the first element 410-13.

Figure 30:
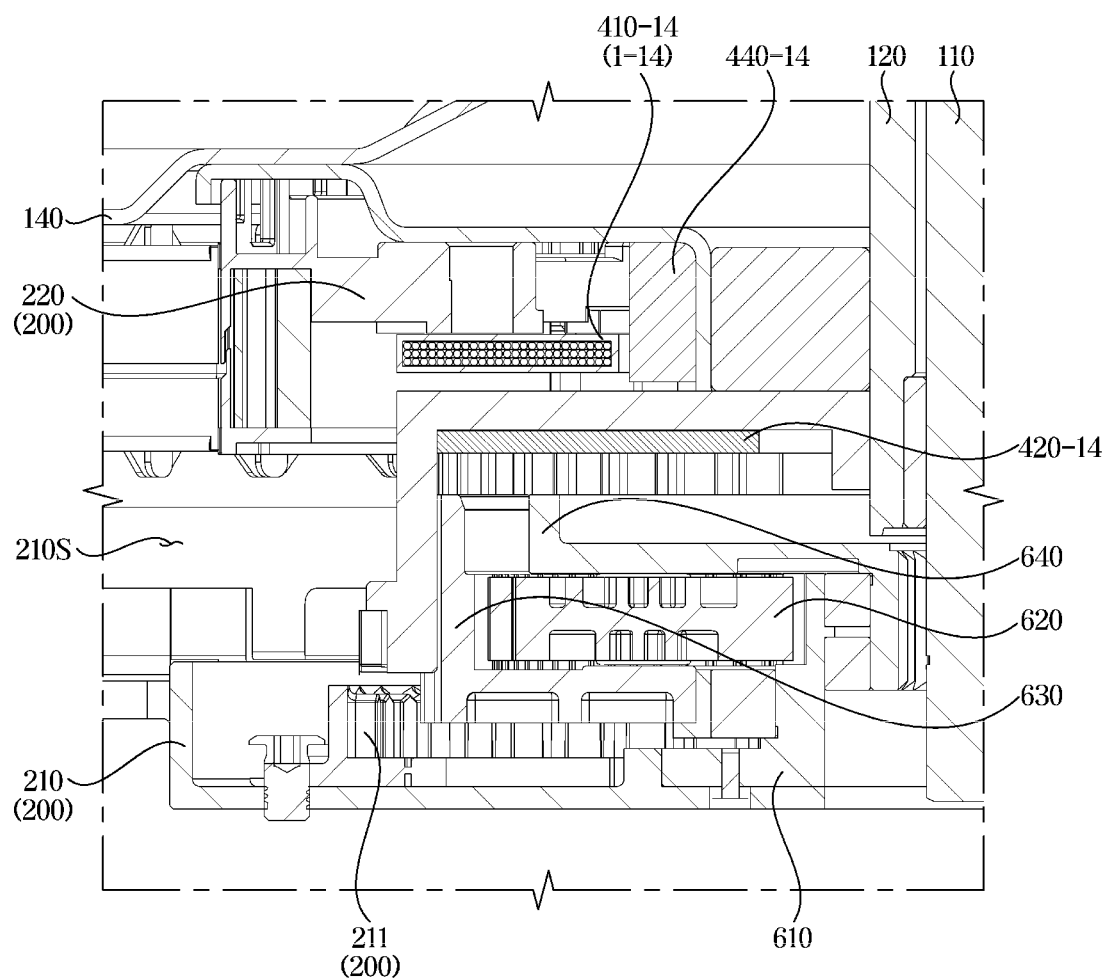
FIG. 30 is a cross-sectional view illustrating a coupler moving device according to an embodiment of the disclosure and a configuration related thereto.

FIG. 30 is a cross-sectional view illustrating a coupler moving device 400-14 according to an embodiment of the disclosure and a configuration related thereto.

The coupler moving device 400-14 according to another embodiment of the disclosure will be described with reference to FIG. 30.

The coupler moving device 400-14 may include a permanent magnet 440-14. The permanent magnet 440-14 may be configured to form a magnetic field.

When the coupler 500 is in the first position, the permanent magnet 440-14 may pull a second element 420-14. Accordingly, the movement of the coupler 500 may be prevented in the first position.

In order to move the coupler 500 from the first position to the second position, it is possible to move the second element 420-14 toward a direction of being away from the first element 410-14 by allowing current to flow through the first element 410-14. During the second element 420-14 is away from the first element 410-14, the coupler 500 may be moved from the first position to the second position.

In order to allow the second element 420-14 to be away from the first element 410-14, the first element 410-14 may generate a magnetic force to allow the second element 420-14 to be moved with a force that is greater than a force that the permanent magnet 440-14 pulls the second element 420-14.

The permanent magnet 440-14 may be positioned above the second element 420-14.

The permanent magnet 440-14 may be located closer to the spin-drying shaft 120 than the first element 410-14. The permanent magnet 440-14 may be coupled to the cover bracket 140.

As is apparent from the above description, a clothes treating apparatus may include a coupler moving device provided to allow at least a portion of the coupler moving device to be positioned in a mounting space of a rotating device, and it is possible to minimize an increase in height of the clothes treating apparatus and to provide the coupler moving device configured to move a coupler.

Further, a clothes treating apparatus may include a coupler moving device including a second element coupled to a coupler and a first element configured to move the second element by a magnetic field, and it is possible to provide the coupler moving device configured to move the coupler without a direct contact with coupler so as to prevent damage of the coupler.

Further, a clothes treating apparatus may include a first element including a plurality of coils each including a closed surface, and the plurality of first elements may be arranged to correspond to a second element. During a coupler is moved by a magnetic field, the plurality of first elements may form a magnetic field to correspond to the second element.

Further, it is possible to implement rotational movement of a coupler by controlling a plurality of first elements independently of each other.

Embodiments of the disclosure may provide a clothes treating apparatus including a housing, a tub arranged inside the housing, a drum arranged inside the tub, and including a washing space defined inside the drum, a spin-drying shaft connected to the drum, a motor assembly including a rotor configured to be rotated and including a mounting space defined inside the rotor, a coupler configured to be moved between a first position, in which the drum is rotatable as the coupler is coupled to the rotor and the spin-drying shaft, and a second position, in which the rotation of the drum is prevented as the coupler is disengaged from the rotor, a second element coupled to the coupler, and a first element configured to move the coupler to the first position or the second position by moving the second element, the first element arranged in the mounting space and disposed in an axial direction connecting the first position and the second position of the coupler in the coupler, the first element provided to be radially symmetric about the spin-drying shaft.

The rotor may be located on one side of the coupler with respect to the axial direction. The first element may be located on the other side opposite to the one side of the coupler with respect to the axial direction and positioned between the coupler and the tub.

The clothes treating apparatus may further include a stator located in the mounting space, provided to extend in a circumferential direction with respect to the spin-drying shaft, and including a stator space defined inside the stator. At least a portion of the coupler may be received in the stator space, and the first element may be received in the stator space.

A cross section, which is cut in a plane including the axial direction, of the first element may have a shape in which a horizontal length is greater than a vertical length.

Embodiments of the disclosure may provide a clothes treating apparatus includes a drum including a washing space defined inside the drum, a spin-drying shaft connected to the drum, a motor assembly including a rotor configured to be rotated, a coupler configured to be moved between a first position, in which the drum is rotatable as the coupler is coupled to the rotor and the spin-drying shaft, and a second position, in which the rotation of the drum is prevented as the coupler is disengaged from the rotor, a second element coupled to the coupler, and a first element configured to move the coupler to the first position or the second position by moving the second element by forming a magnetic field during current flows.

Unless explicitly stated, the embodiments described above may be combined with other embodiments. Unless one embodiment is clearly limited in combination with another embodiment, it should be understood that combinations are possible between the embodiments. A combination of one embodiment and another embodiment is considered to be disclosed in this disclosure.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A clothes treating apparatus comprising:
   a housing;
   a tub inside the housing;
   a drum configured to be rotated inside the tub;
   a spin-drying shaft connected to the drum;
   a motor assembly including a rotor configured to be rotated;
   a coupler;
   a first element; and
   a second element inside the coupler,
   wherein
   the coupler is positionable in a first position in which the coupler is coupled to the spin-drying shaft and the rotor,
   the coupler is positionable in a second position in which the coupler is coupled to the spin-drying shaft and disengaged from the rotor,
   with the coupler being positioned in the second position, the first element and the second element are configured to interact to move the second element away from the first element and thereby move the coupler from the second position to the first position,
   the first element includes a coil configured to form a magnetic field in response to application of a current to the coil, and
   the second element is movable to be close to or away from the first element by the magnetic field formed by the coil.

2. The clothes treating apparatus of claim 1, wherein
   the rotor is located on a first side of the coupler in a direction in which the coupler is moved to the first position, and
   in order to prevent interference between the coupler and the rotor, the first element is positioned between the coupler and the tub so that the first element is positioned on a second side of the coupler opposite to the first side of the coupler.

3. The clothes treating apparatus of claim 1, wherein
   the rotor has a mounting space inside the rotor,
   the clothes treating apparatus further comprises:
   a stator arranged about the spin-drying shaft and configured so that least a portion of the stator is positioned in the mounting space,
   the stator includes a stator space inside the stator,
   at least a portion of the coupler is positioned in the stator space, and
   the first element is positioned in the stator space.

4. The clothes treating apparatus of claim 3, wherein
   the spin-drying shaft configured to passes through the stator space, and
   the first element includes a coil wound in a circumferential direction with respect to the spin-drying shaft.

5. The clothes treating apparatus of claim 1, wherein
   the first element has a cross section having a horizontal length that is greater than a vertical length.

6. The clothes treating apparatus of claim 1, wherein
   the second element is in contact with the coupler, and is coupled to the coupler at a side of the coupler facing the first element.

7. The clothes treating apparatus of claim 6, wherein
   the coupler includes a receiving space inside of the coupler, and
   the second element is positioned in the receiving space.

8. The clothes treating apparatus of claim 6, wherein the second element is positioned to correspond to the first element.

9. The clothes treating apparatus of claim 1, wherein the first element includes a plurality of coils, and
the plurality of coils are arranged in a circumferential direction with respect to the spin-drying shaft so that a magnetic field is formable at a position in which the plurality of coils is arranged.

10. The clothes treating apparatus of claim 9, wherein the plurality of coils includes:
a first coil layer spaced apart from the coupler by a first distance, and
a second coil layer spaced apart from the coupler by a second distance that is greater than the first distance, and
the second coil layer is independently controlled from the first coil layer.

11. The clothes treating apparatus of claim 1, wherein the first element includes a plurality of part elements arranged in a circumferential direction with respect to the spin-drying shaft, and connected to each other so that all of the plurality of part elements are controllable with a single control signal.

12. The clothes treating apparatus of claim 3, wherein the stator space includes:
a central space through which the spin-drying shaft passes, and
a branch space communicated with the central space and disposed in a circumferential direction with respect to the central space, and
the first element includes:
a first part element in the central space, and
a second part element in the branch space.

13. The clothes treating apparatus of claim 1, wherein the first element includes a coil wound around the spin-drying shaft to form a magnetic field corresponding to the spin-drying shaft.

14. The clothes treating apparatus of claim 1, further comprising:
a pulsator configured to be rotated inside the drum;
a reduction gear module coupled to the rotor so that least a portion of the reduction gear module is rotatable at an angular velocity that is lower than an angular velocity of the rotor; and
a washing shaft coupled to the pulsator and the reduction gear module to allow the pulsator to be rotated at the angular velocity that is lower than the angular velocity of the rotor,
wherein the coupler is configured to be couplable to the spin-drying shaft and the rotor so that the spin-drying shaft is allowed to be rotated at the angular velocity of the rotor.

* * * * *